US010176567B2

(12) United States Patent
Besley et al.

(10) Patent No.: US 10,176,567 B2
(45) Date of Patent: Jan. 8, 2019

(54) PHYSICAL REGISTRATION OF IMAGES ACQUIRED BY FOURIER PTYCHOGRAPHY

(71) Applicant: CANON KABUSHIKI KAISHA, Tokyo (JP)

(72) Inventors: James Austin Besley, Killara (AU); Peter Alleine Fletcher, Rozelle (AU); Steven David Webster, Scotland Island (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 14/977,394

(22) Filed: Dec. 21, 2015

(65) Prior Publication Data
US 2017/0178317 A1    Jun. 22, 2017

(51) Int. Cl.
| | |
|---|---|
| G06T 7/00 | (2017.01) |
| G06T 5/00 | (2006.01) |
| G02B 21/36 | (2006.01) |
| G06K 9/46 | (2006.01) |
| G02B 21/00 | (2006.01) |

(52) U.S. Cl.
CPC ........ *G06T 7/0012* (2013.01); *G02B 21/0004* (2013.01); *G02B 21/367* (2013.01); *G06K 9/4671* (2013.01); *G06T 5/00* (2013.01); *G06T 7/0028* (2013.01); *G06K 2009/4666* (2013.01); *G06T 2207/30004* (2013.01); *G06T 2207/30168* (2013.01)

(58) Field of Classification Search
CPC ..... G06T 7/0012; G06T 5/00; G02B 21/0004; G02B 21/367; G06K 9/4671
USPC .............. 348/80; 250/282, 288; 356/301, 36
See application file for complete search history.

(56) References Cited

U.S. PATENT DOCUMENTS

| | | | |
|---|---|---|---|
| 6,658,059 B1 | 12/2003 | Iu et al. | |
| 8,866,063 B2 | 10/2014 | Ozcan et al. | |
| 2006/0038891 A1* | 2/2006 | Okutomi | ................ H04N 9/045 348/222.1 |
| 2009/0290766 A1* | 11/2009 | Salafia | .................. G06T 7/0012 382/128 |

(Continued)

OTHER PUBLICATIONS

Lucas et al., "An Iterative Image Registration Technique with an Application to Stereo Vision", Proc. 7th Intl Joint Conf on Artificial Intelligence (IJCAI), Aug. 24-28, 1981, pp. 674-679.

(Continued)

*Primary Examiner* — Marnie A Matt
(74) *Attorney, Agent, or Firm* — Canon U.S.A., Inc. IP Division

(57) ABSTRACT

A method for processing microscopy images captures, for each of a first microscopy slide and a second microscopy slide, a plurality of partial spectrum images under multiple optical configurations where each image captures a different portion of the spectrum of the slide. First and second partial spectrum images associated with different optical configuration are selected and used to reconstruct respectively a combined spectrum image of part of the first microscopy slide and a combined spectrum image of at least part of the second microscopy slide, thereby forming a first pair of partial spectrum images. The method determines a distortion map by aligning images derived from the first pair of the partial spectrum images.

23 Claims, 26 Drawing Sheets

(56) References Cited

U.S. PATENT DOCUMENTS

| | | | | |
|---|---|---|---|---|
| 2013/0188035 A1* | 7/2013 | Goodwin | ............... | G02B 21/34 348/79 |
| 2013/0300853 A1* | 11/2013 | Goodwin | ........... | G01N 21/6428 348/79 |
| 2014/0118529 A1* | 5/2014 | Zheng | ...................... | G21K 7/00 348/80 |
| 2014/0126691 A1* | 5/2014 | Zheng | ...................... | G21K 7/00 378/43 |
| 2014/0316238 A1* | 10/2014 | Berkner | ............... | G02B 23/243 600/407 |
| 2014/0368812 A1* | 12/2014 | Humphry | ............... | G01B 11/24 356/124 |
| 2015/0036038 A1 | 2/2015 | Horstmeyer et al. | | |
| 2015/0054979 A1* | 2/2015 | Ou | ...................... | G02B 21/084 348/222.1 |
| 2015/0264250 A1* | 9/2015 | Ou | ...................... | G06T 7/0012 348/77 |
| 2015/0317508 A1* | 11/2015 | Zheng | .................. | G02B 21/365 348/80 |
| 2016/0088205 A1* | 3/2016 | Horstmeyer | ......... | H04N 5/2256 348/80 |
| 2016/0091720 A1* | 3/2016 | Stafford | ............. | G02B 27/0172 345/8 |
| 2016/0187849 A1* | 6/2016 | Zhang | ................ | G02B 21/0016 348/41 |
| 2016/0202460 A1* | 7/2016 | Zheng | .................. | H04N 5/2256 348/79 |
| 2017/0115557 A1* | 4/2017 | Peters | ...................... | G03F 1/84 |
| 2017/0167856 A1* | 6/2017 | Stoppe | .................... | G01B 11/14 |
| 2017/0205617 A1* | 7/2017 | Stoppe | ................. | G02B 21/367 |
| 2017/0280039 A1* | 9/2017 | Stoppe | ................. | H04N 5/2354 |

OTHER PUBLICATIONS

Baker et al., "Lucas-Kanade 20 Years on: A Unifying Framework", International Journal of Computer Vision, (2004), pp. 221-255, vol. 56., No. 3.

\* cited by examiner

PHYSICAL REGISTRATION OF IMAGES ACQUIRED BY FOURIER PTYCHOGRAPHY

TECHNICAL FIELD

The current invention relates to Fourier Ptychographic microscopy and, in particular, to registration of specimens imaged by means of Fourier Ptychographic microscopy.

BACKGROUND

Virtual microscopy is a technology that gives physicians the ability to navigate and observe a biological specimen as though they were controlling a microscope. This can be achieved using a display device such as a computer monitor or tablet with access to a database of microscope images of the specimen. Enhanced observation of biological specimens can afford physicians greater opportunity to perform a medical diagnosis upon the subject from which the specimens were obtained.

Capture of images for virtual microscopy is generally performed using a high throughput slide scanner. The specimen is loaded mechanically onto a stage and moved under the microscope objective as images of different parts of the specimen are captured on a sensor. Any two adjacent captured images have a region of overlap so that the multiple images of the same specimen can be combined, or spliced, to form a two-dimensional (2D) layer or a three-dimensional (3D) volume.

Alternatively, Fourier Ptychographic Microscopy (FPM) can be used for whole slide imaging. FPM is able to produce a high resolution and wide field of view image without a need for transverse motion of the specimen under the objective lens. This is achieved by capturing many intensity images of the specimen under different lighting conditions, and combining the images in the Fourier domain using an iterative computational process.

Virtual microscopy can be applied to image histology specimens prepared from a tissue sample by freezing the sample in paraffin and then slicing into sections or layers. The slices may be stained to reveal particular features, and placed on a microscope slide under a cover slip. These specimen slides are then converted into digital slides by virtual microscopy. A clinician may subsequently examine several adjacent digital slides of the specimen tissue to assess the extent of a disease throughout the tissue. Accordingly, it is often desirable to align the digital slides so that a clinician can easily assess the tissue sample.

There may, however, be complex, nonlinear deformations between adjacent digital slides, which make registration of digital slides difficult. One such factor is the physical axial distance between the digital slides. For instance, if the axial distance between two adjacent sections is large, the digital slides of these sections may contain less common features upon which registration may be performed. Another factor may be variations in the sections introduced when the sections are cut. For instance, striations (ridges), folds, tears, or other physical deformations may be introduced independently to the sections during cutting. A third factor may be variations in the sections caused by staining the section. For instance, different preparations applied to the tissue for staining may be different between sections and cause the same feature to appear quite differently when imaged.

In spite of the difficulties, a variety of registration methods may be employed to align digital slides including, optical or normal flow based methods, information-theoretic methods (e.g. mutual information), cross-correlation-based methods, gradient based methods, and more recently methods that utilize advanced statistical methods from machine learning. Additionally, there are many ways to model the non-linear deformations that occur between images that either take into account a physical-based model of tissue deformations, such as elastic material deformation or fluid flow, or attempt to model the deformations using basis functions such as radial basis functions, wavelet transforms, and B-splines.

However, such methods are usually slow when applied to large (e.g. 25,000 by 25,000 pixels) whole slide images. For example, it may take tens of minutes to register two 25,000× 25,000 pixel images depending on the techniques used, making virtual microscopy practically difficult to use by clinicians. Therefore, there is a need to improve overall throughput of the virtual microscopy systems, particularly, to provide registered images of adjacent slides to a clinician faster.

SUMMARY

Presently disclosed are approaches to microscopic image registration that facilitate enhanced throughput. A first approach makes use of the raw FPM image data rather than reconstructed images to estimate a distortion map between the images to be registered. This allows parallel processing, so the distortion map is available when image reconstruction is completed resulting in an improvement in overall system execution time.

A second approach makes use of the distortion map to seed the reconstruction of the second image. This results in an improvement in reconstruction execution time and/or accuracy.

A third approach makes use of phase information in the warp estimation process.

According to one aspect of the present disclosure, there is provided

According to one aspect of the present disclosure, there is provided a computer-implementable method for processing images captured using a microscopy device, the method comprising: for each of a first microscopy slide and a second microscopy slide, capturing a plurality of partial spectrum images under multiple optical configurations so that each partial spectrum image captures a different portion of the spectrum of substantially the same area of the microscopy slide; selecting, from a first plurality of partial spectrum images, a partial spectrum image associated with a first optical configuration, wherein the first plurality of partial spectrum images is used to reconstruct a combined spectrum image of at least part of the first microscopy slide; determining a partial spectrum image in a second plurality of partial spectrum images captured under substantially the same optical configuration as the selected partial spectrum image to establish a first pair of partial spectrum images, wherein the second plurality of partial spectrum images is used to reconstruct a combined spectrum image of at least part of the second microscopy slide; and determining a distortion map by aligning images derived from the first pair of the corresponding partial spectrum images, wherein the determined distortion map is used in combination with at least one of the combined spectrum images to facilitate further medical diagnosis.

Desirably, the method further comprises: selecting, from a first plurality of partial spectrum images, a partial spectrum image associated with a second optical configuration; determining a partial spectrum image in a second plurality of partial spectrum images captured under the second optical configuration to establish a second pair of partial spectrum images; generating a first distortion map by aligning the first pair of spectrum images; generating a second distortion map by aligning the second pair of spectrum images; and combining the first distortion map and the second distortion map to determine the distortion map for aligning the combined spectrum images.

Most preferably the combined spectrum image of the first slide corresponds to a region of interest that covers a part of the first slide and the combined spectrum image of the second slide covers a corresponding region.

In a specific implementation, the method further comprises: selecting a region of interest within the first microscopy slide; determining a corresponding region in the second microscopy slide using a position of the selected region of interest within the first microscopy slide and the determined distortion map; selecting at least one portion in each image of the second plurality of partial spectrum images based on the determined region; and reconstructing the corresponding region of the second microscopy slide using the selected portions.

Advantageously the method may further comprises applying the distortion map to the combined spectrum images of the first microscopy slide to form a warped image; and using the warped image as an estimate in the process of reconstructing the second microscopy slide.

In a specific example the reconstructing is done to the exclusion of the non-selected portions of the slide images. In an alternative approach, the first optical configuration and the second optical configuration correspond to low transverse wavevectors in Fourier space near to DC. Desirably, the first optical configuration corresponds to optical configurations for the DC transverse wavevectors only. Advantageously, the first optical configuration and the second optical configuration correspond to optical configurations for the DC transverse wavevector and a set of wavevectors adjacent to the DC transverse wavevector respectively.

Typically the microscopy device is a Fourier Ptychographic Microscopy device and the reconstruction of the combined spectrum image recovers phase information of the microscopy slide. In a specific implementation the process of recovering phase information for at least one of the microscopy slides is performed in parallel with determining the distortion map.

Typically the optical configurations are obtained by varying illumination settings and the optical configuration used to capture an image is encoded as a wavevector.

In another example the method may further comprise applying the determined distortion map to the combined spectrum image of the second slide to align the combined spectrum image of the second slide with the combined spectrum image of the first slide. In another arrangement, the method displays the distortion map as a supplement to displayed combined spectrum images. Also the distortion map may be used to highlight areas of high distortion in at least one of the combined spectrum images.

In specific implementations, the distortion map is determined based on the at least one pair of the corresponding partial spectrum images concurrently with reconstructing at least one of the first microscopy slide and the second microscopy slide.

In preferred implementations, the determining of the distortion map further comprises: selecting a subset of the first plurality of partial spectrum images and a corresponding subset of the second plurality of partial spectrum images based on illumination settings used to capture the partial spectrum images; partially reconstructing the first microscopy slide and the second microscopy slide using the respective selected subsets to recover phase information of the corresponding slide; and determining the distortion map for the partially reconstructed images using the recovered phase information.

In other arrangements involve the captured plurality of partial spectrum images represent different frequency bands of substantially the same area of the microscopy slide; and the selecting comprising selecting, from a first plurality of the images used to form a combined spectrum image of the first microscopy slide, a first image capturing a first frequency band of the first microscopy slide; the determining comprising identifying, in a second plurality of the images used to form a combined spectrum image of the second microscopy slide, a second image capturing substantially the first frequency band of the second microscopy slide; and determining a distortion map by aligning the first image and the second image, wherein the determined distortion map is used in combination with at least one of the combined spectrum images to facilitate further medical diagnosis.

In specific implementations, the identifying the second image comprises: analysing illumination conditions used to capture images in the second plurality of images: comparing the illumination conditions associated with the second plurality of image with the first illumination condition to select a similar illumination condition: and selecting, from the second plurality of images, an intensity image associated with the selected similar illumination condition.

Other aspects, including a computer-readable storage medium having code for performing the method(s), and an imaging system, are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Figure 1:
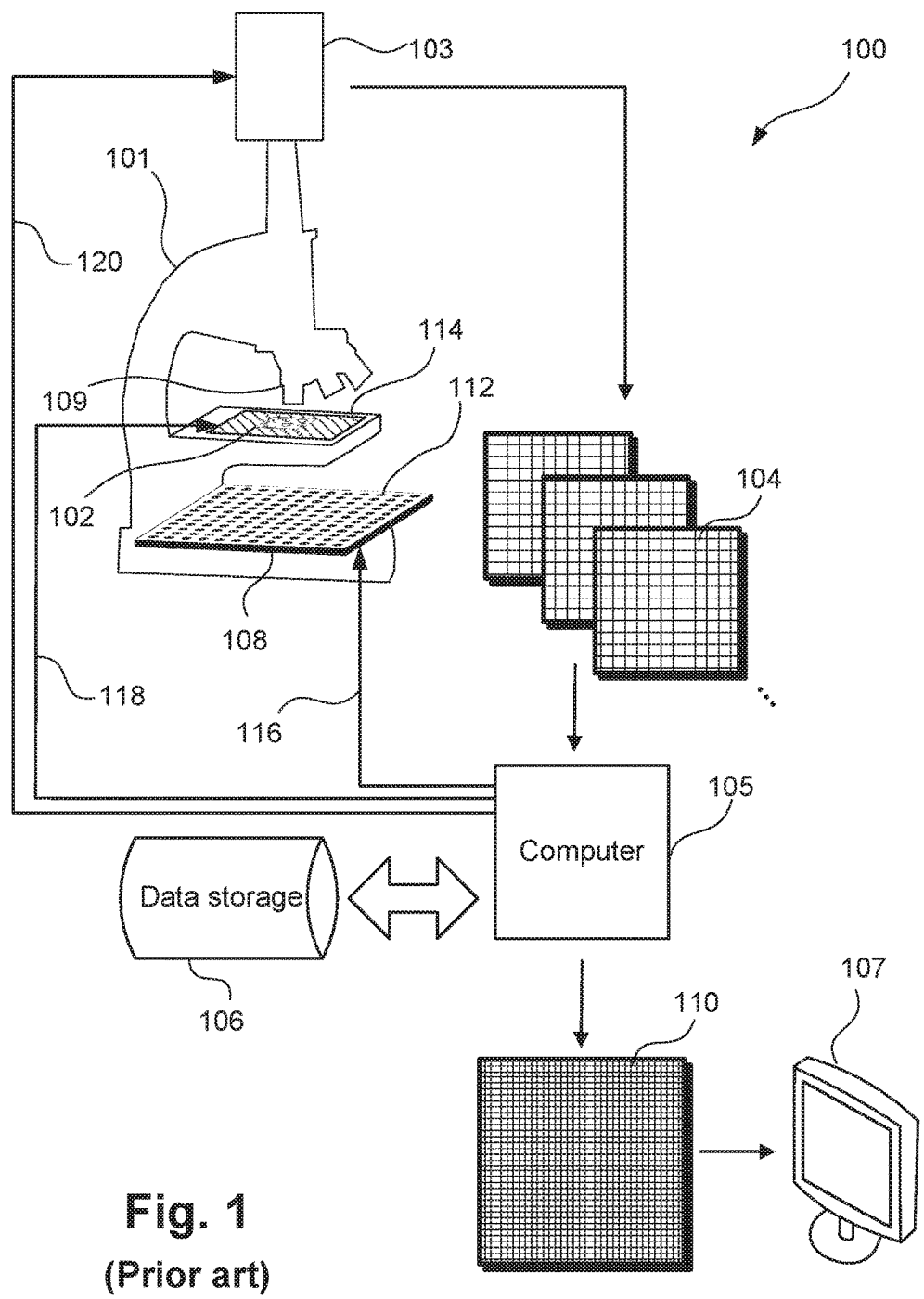
FIG. 1 shows a high-level system diagram for a Fourier Ptychographic Microscopy system within which the arrangements presently disclosed may be performed.

FIG. 1 shows a high-level system diagram for a prior art microscope capture system 100 suitable for Fourier Ptychographic Microscopy (FPM) and with the arrangements presently disclosed. A specimen 102 is physically positioned on a stage 114 under an optical element, such as a lens 109, and within the field of view of a microscope 101, which in this configuration operates as a microscopy device. The microscope 101 in the illustrated implementation has a stage 114 that may be configured to move in order to correctly place the specimen in the field of view of the microscope at an appropriate depth. The stage 114 may also move as multiple images of the specimen are captured by a camera 103 mounted to the microscope 101. In a standard configuration, the stage 114 may be fixed during image capture of the specimen.

A variable illumination system (illuminator) 108 is positioned in association with the microscope 101 so that the specimen 102 may be illuminated by coherent or partially coherent light incident at different angles.

The microscope 101 forms an intensity image of the specimen 102 on a sensor in the camera 103 by means of an optical system. The optical system may be based on an optical element that may include an objective lens 109 with low numerical aperture (NA), or some other arrangement. The camera 103 captures one or more intensity images 104 corresponding to each illumination configuration. Multiple images may be captured at different stage positions and/or different colours of illumination. The arrangement provides for the imaging of the specimen 102, including the capture and provision of multiple intensity images of the specimen 102 to a computer 105.

The intensity images may be greyscale images or colour images, depending on the sensor and illumination. The captured intensity images 104 are usually of relatively low resolution. The captured images 104 are also sometimes referred to as partial spectrum images as each of such images represents a distinct spatial frequency band of the spectrum of the specimen, depending on particular illumination settings. The spatial frequency bands of the captured intensity images do not usually overlap, unless they correspond to adjacent wavevectors. The images 104 are passed to the computer system 105 which can either start processing the images immediately or store them in temporary storage 106 for later processing. As part of the processing, the computer 105 generates a combined spectrum image 110 corresponding to one or more regions of the specimen 102, which is relatively of a higher resolution. The combined spectrum image 110, or also referred to as the reconstructed image, may be reproduced upon a display device 107.

As illustrated, the computer 105 may be configured to control operation of the individual light emitters 112 of the illuminator 108 via a control line 116. Also, the computer 105 may be configured to control movement of the stage 114, and thus the specimen 102, via a control line 118. A further control line 120 may be used by which the computer 105 may control the camera 103 for capture of the images 104.

The transverse optical resolution of the microscope 101 may be estimated based on the optical configuration of the microscope 101 and is related to the point spread function of the microscope. A standard approximation to this resolution in air is given by:

$$D_r = \frac{0.61\lambda}{NA}, \qquad (1)$$

where NA is the numerical aperture, and $\lambda$ is the wavelength of light. A conventional slide scanner might use an air immersion objective lens with an NA of 0.7. At a wavelength of 500 nm, the estimated resolution is 0.4 μm. A typical FPM system would use a lower NA of the order of 0.08 for which the estimated resolution drops to 4 μm.

The numerical aperture of a lens defines a half-angle. $\theta_H$, of the maximum cone of light that can enter or exit the lens. In air, this is defined by:

$$\theta_H = \arcsin(NA), \qquad (2)$$

in terms of which the full acceptance angle of the lens can be expressed as $\theta_F = 2\theta_H$.

The specimen 102 being observed may be a biological specimen such as a histology slide consisting of a tissue fixed in a substrate and stained to highlight specific features. Such specimens are substantially translucent. Such a slide may include a variety of biological features on a wide range of scales. The features in a given slide depend on the specific tissue sample and stain used to create the histology slide. The dimensions of the specimen on the slide may be of the order of 10 mm×10 mm or larger. If the transverse resolution of a virtual slide was selected as 0.4 μm, each layer in the slide would consist of at least 25,000 by 25,000 pixels.

The variable illumination system 108 may be formed using a set of LEDs arranged on a flat substrate, referred to as an LED matrix. The LEDs may be monochromatic or multi-wavelength, for example they may illuminate at 3 separate wavelengths corresponding to red, green and blue light, or they may illuminate at an alternative set of wavelengths appropriate to viewing specific features of the specimen. The appropriate spacing of the LEDs on the substrate depends on the microscope optics and the distance from the specimen 102 to the illumination plane, being that plane defined by the flat substrate supporting the individual light emitters 112. Each emitter 112, operating as a point light source, establishes a corresponding angle of illumination to the specimen 102. Where the distance between the light source 112 and the specimen 102 is sufficiently large, the light emitted from the light source 112 approximates a plane wave. In general, the spacing of the LEDs on the substrate should be chosen so that the difference in angle of illumination arriving from a pair of neighbouring LEDs is less than the acceptance angle $\theta_F$ defined by the numerical aperture of the lens 109 according to Equation 2 above.

It is helpful to consider aspects of the optical system in Fourier space. Two-dimensional (2D) Fourier space is a space defined by a 2D Fourier transform of the 2D real space in which the captured images are formed, or in which the transverse spatial properties of the specimen may be defined. The coordinates in this Fourier space are the transverse wavevectors $(k_x, k_y)$. The transverse wavevectors represent the spatial frequency of the image, with low frequencies (at or near zero) being toward the centre of the coordinate representation, and higher frequencies being toward the periphery of the coordinate representation. The terms transverse 'wavevector' and 'spatial frequency' are used interchangeably in this description. The terms radial transverse wavevector and radial spatial frequency are likewise interchangeable.

Each captured image is associated with a region in Fourier space defined by the optical transfer function of the optical element 109 and also by the angle of illumination set by the variable illuminator. For the purposes of further explanation the terms 'a captured image', 'a partial spectrum image' and 'a captured FPM image' are used interchangeably. For the case where the optical element 109 is an objective lens, the region in Fourier space can be approximated as a circle of radius $r_k$ (a circular region) defined by the product of the wavenumber of illumination in vacuum, $k_0=2\pi/\lambda$, and the numerical aperture:

$$r_k = k_0 NA. \qquad (3)$$

Figure 7A:
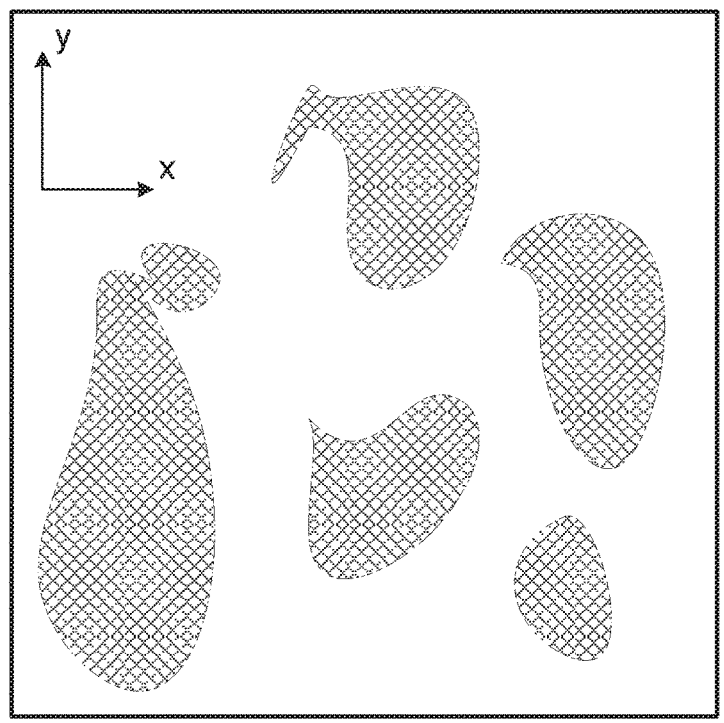
FIGS. 7A and 7B illustrate respectively the real space and Fourier space representations of a specimen.
Figure 7B:
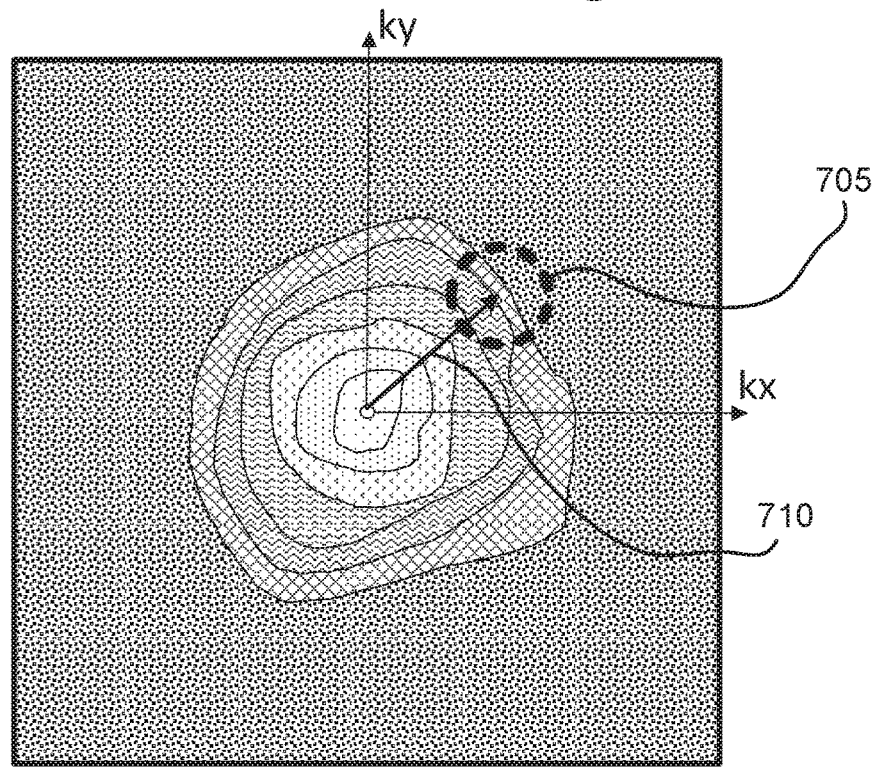

The position of the circular region is offset from the origin (DC position) of the Fourier space according to the angle of illumination. For the $i^{th}$ illumination angle, the offset is defined by the transverse components of the wavevector $(k_x^i, k_y^i)$. This is illustrated in FIGS. 7A and 7B which show real space and Fourier space representations respectively of a schematic specimen. The dashed circle in FIG. 7B represents the circular region associated with a single capture image with an illumination for which the transverse wavevector 710 is shown by the solid arrow of FIG. 7B. The transverse wavevectors $(k_x^i, k_y^i)$ may be considered as representing the light source position on a synthetic aperture.

In an alternative mode of Fourier Ptychographic imaging, FPM captured images may be obtained using a shifted aperture as an optical element (also referred to as aperture-scanning) rather than angled illumination. In this arrangement, the sample is illuminated using a single plane wave incident approximately along the optical axis. The aperture is set in the Fourier plane of the imaging system 100 and the aperture moves within this plane, perpendicular to the optical axis. This kind of scanning aperture may be achieved using a high NA lens with an additional small scanning aperture that restricts the light passing through the optical system. The aperture in such a scanning aperture system may be considered as selecting a region in Fourier space represented by the dashed circle in FIG. 7B outside which the spectral content is blocked. The size of the dashed circle in FIG. 7B corresponds to the small aperture of a low NA lens. The transverse wavevector $(k_x^i, k_y^i)$ may be considered as representing the shifted position of the aperture rather than the transverse wavevector of angled illumination. It is noted that a spatial light modulator in the Fourier plane may be used rather than a scanning aperture to achieve the same effect. An example of a spatial light modulator is an liquid crystal display (LCD) for which individual pixels or groups of pixels can be switched from transparent to opaque, thereby spatially modulating the passage of light through the display.

For an image of a natural specimen it is known that the value of any given pixel value is not independent of the rest of the image. This is due to the inherent structure of the natural objects being images. It is possible to measure the single pixel redundancy for such images. As a consequence, the value of the Fourier transform of a natural image at a particular wavevector is not entirely independent of the values of the Fourier transform at other wavevectors. On the other hand, the value is not entirely dependent on the value at other wavevectors and can be described as partially dependent.

Therefore, for a natural specimen, different regions of an object spectrum are not completely independent, however, they are also not completely dependent. It is generally not possible to accurately estimate the full object spectrum of such a specimen given the signal over a restricted region or set of regions of the spectrum. The different parts of the spectrum can be considered to be partially independent, so that the capture FPM images corresponding to different transverse wavevectors can be considered as partially independent.

The partial independence of the images corresponding to different spectral regions may also be reduced due to the optical transmission and sampling in the system. This can happen, for example, if there is fixed pattern noise on the sensor.

Figure 18A:
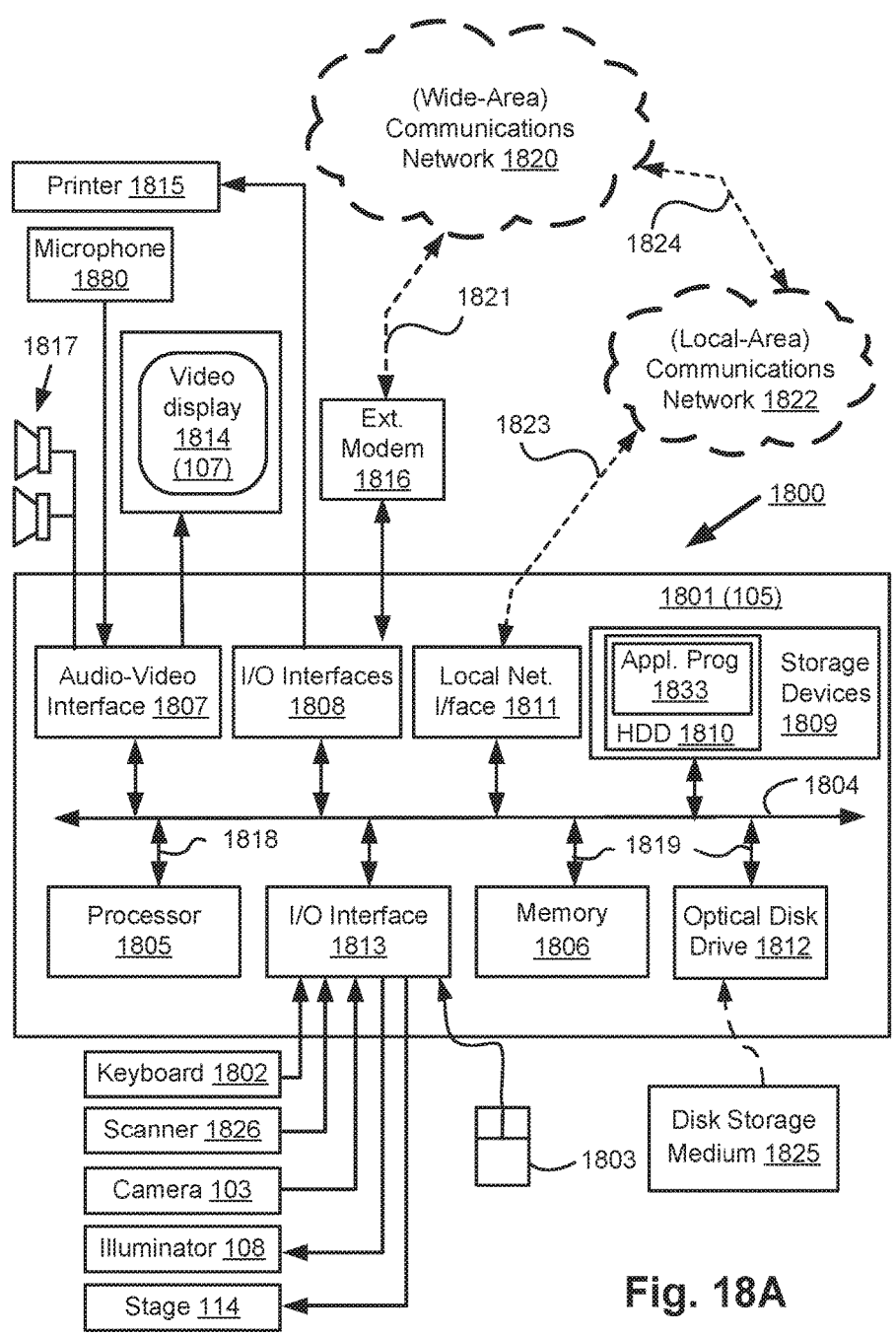
FIGS. 18A and 18B form a schematic block diagram of a general purpose computer system upon which arrangements described can be practiced.
Figure 18B:
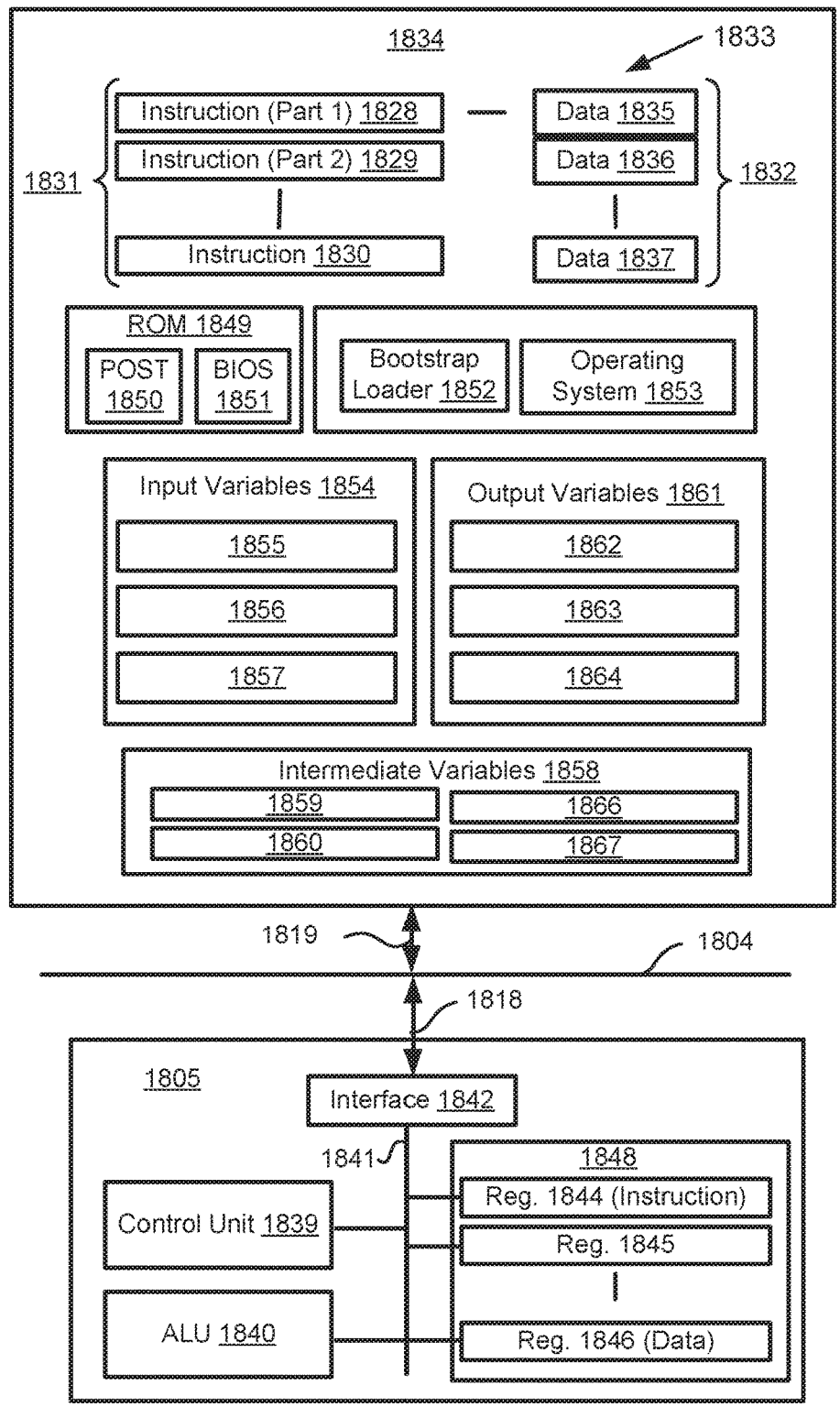

FIGS. 18A and 18B depict a general-purpose computer system 1800, upon which the various arrangements described can be practiced.

As seen in FIG. 18A, the computer system 1800 includes: a computer module 1801 representative of the computer 105: input devices such as a keyboard 1802, a mouse pointer device 1803, a scanner 1826, a camera 1827, and a microphone 1880; and output devices including a printer 1815, a display device 1814 representative of the display 107, and loudspeakers 1817. An external Modulator-Demodulator (Modem) transceiver device 1816 may be used by the computer module 1801 for communicating to and from a communications network 1820 via a connection 1821. The communications network 1820 may be a wide-area network (WAN), such as the Internet, a cellular telecommunications network, or a private WAN. Where the connection 1821 is a telephone line, the modem 1816 may be an ADSL modem. Alternatively, where the connection 1821 is a high capacity (e.g., cable) connection, the modem 1816 may be a broadband modem. A wireless modem may also be used for wireless connection to the communications network 1820.

The computer module 1801 typically includes at least one processor unit 1805, and a memory unit 1806. For example, the memory unit 1806 may have semiconductor random access memory (RAM) and semiconductor read only memory (ROM). The computer module 1801 also includes an number of input/output (I/O) interfaces including: an audio-video interface 1807 that couples to the video display 1814, loudspeakers 1817 and microphone 1880; an I/O interface 1813 that couples to the keyboard 1802, mouse 1803, scanner 1826, camera 1827 and optionally a joystick or other human interface device (not illustrated); and an interface 1808 for the external modem 1816 and printer 1815. In some implementations, the modem 1816 may be incorporated within the computer module 1801, for example within the interface 1808. The computer module 1801 also has a local network interface 1811, which permits coupling of the computer system 1800 via a connection 1823 to a local-area communications network 1822, known as a Local Area Network (LAN). As illustrated in FIG. 18A, the local communications network 1822 may also couple to the wide network 1820 via a connection 1824, which would typically include a so-called "firewall" device or device of similar functionality. The local network interface 1811 may comprise an Ethernet circuit card, a Bluetooth™ wireless arrangement or an IEEE 802.11 wireless arrangement; however, numerous other types of interfaces may be practiced for the interface 1811.

The I/O interfaces 1808 and 1813 may afford either or both of serial and parallel connectivity, the former typically being implemented according to the Universal Serial Bus (USB) standards and having corresponding USB connectors (not illustrated). Storage devices 1809 are provided and typically include a hard disk drive (HDD) 1810. Other storage devices such as a floppy disk drive and a magnetic tape drive (not illustrated) may also be used. An optical disk drive 1812 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1800.

The components 1805 to 1813 of the computer module 1801 typically communicate via an interconnected bus 1804 and in a manner that results in a conventional mode of operation of the computer system 1800 known to those in the relevant art. For example, the processor 1805 is coupled to the system bus 1804 using a connection 1818. Likewise, the memory 1806 and optical disk drive 1812 are coupled to the system bus 1804 by connections 1819. Examples of computers on which the described arrangements can be practised include IBM-PC's and compatibles, Sun Sparcstations, Apple Mac™ or a like computer systems.

The image processing methods to be described may be implemented using the computer system 1800 wherein the processes of FIGS. 2 to 17 and 19 to 25, to be described, may be implemented as one or more software application programs 1833 executable within the computer system 1800. In particular, the steps of the methods are effected by instructions 1831 (see FIG. 18B) in the software 1833 that are carried out within the computer system 1800. The software instructions 1831 may be formed as one or more code modules, each for performing one or more particular tasks. The software may also be divided into two separate parts, in which a first part and the corresponding code modules performs the image processing methods and a second part and the corresponding code modules manage a user interface between the first part and the user.

The software may be stored in a computer readable medium, including the storage devices described below, for example. The software is loaded into the computer system 1800 from the computer readable medium, and then executed by the computer system 1800. A computer readable medium having such software or computer program recorded on the computer readable medium is a computer program product. The use of the computer program product in the computer system 1800 preferably effects an advantageous apparatus for image processing.

The software 1833 is typically stored in the HDD 1810 or the memory 1806. The software is loaded into the computer system 1800 from a computer readable medium, and executed by the computer system 1800. Thus, for example, the software 1833 may be stored on an optically readable disk storage medium (e.g., CD-ROM) 1825 that is read by the optical disk drive 1812. A computer readable storage medium having such software or computer program recorded on it is a computer program product. The use of the computer program product in the computer system 1800 preferably effects an apparatus for image processing.

In some instances, the application programs 1833 may be supplied to the user encoded on one or more CD-ROMs 1825 and read via the corresponding drive 1812, or alternatively may be read by the user from the networks 1820 or 1822. Still further, the software can also be loaded into the computer system 1800 from other computer readable media. Computer readable storage media refers to any non-transitory tangible storage medium that provides recorded instructions and/or data to the computer system 1800 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1801. Examples of transitory or non-tangible computer readable transmission media that may also participate in the provision of software, application programs, instructions and/or data to the computer module 1801 include radio or infra-red transmission channels as well as a network connection to another computer or networked device, and the Internet or Intranets including e-mail transmissions and information recorded on Websites and the like.

The second part of the application programs 1833 and the corresponding code modules mentioned above may be executed to implement one or more graphical user interfaces (GUIs) to be rendered or otherwise represented upon the display 1814. Through manipulation of typically the keyboard 1802 and the mouse 1803, a user of the computer system 1800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1817 and user voice commands input via the microphone 1880.

FIG. 18B is a detailed schematic block diagram of the processor 1805 and a "memory" 1834. The memory 1834 represents a logical aggregation of all the memory modules (including the HDD 1809 and semiconductor memory 1806) that can be accessed by the computer module 1801 in FIG. 18A.

When the computer module 1801 is initially powered up, a power-on self-test (POST) program 1850 executes. The POST program 1850 is typically stored in a ROM 1849 of the semiconductor memory 1806 of FIG. 18A. A hardware device such as the ROM 1849 storing software is sometimes referred to as firmware. The POST program 1850 examines hardware within the computer module 1801 to ensure proper functioning and typically checks the processor 1805, the memory 1834 (1809, 1806), and a basic input-output systems software (BIOS) module 1851, also typically stored in the ROM 1849, for correct operation. Once the POST program 1850 has run successfully, the BIOS 1851 activates the hard disk drive 1810 of FIG. 18A. Activation of the hard disk drive 1810 causes a bootstrap loader program 1852 that is resident on the hard disk drive 1810 to execute via the processor 1805. This loads an operating system 1853 into the RAM memory 1806, upon which the operating system 1853 commences operation. The operating system 1853 is a system level application, executable by the processor 1805, to fulfil various high level functions, including processor management, memory management, device management, storage management, software application interface, and generic user interface.

The operating system 1853 manages the memory 1834 (1809, 1806) to ensure that each process or application running on the computer module 1801 has sufficient memory in which to execute without colliding with memory allocated to another process. Furthermore, the different types of memory available in the system 1800 of FIG. 18A must be used properly so that each process can run effectively. Accordingly, the aggregated memory 1834 is not intended to illustrate how particular segments of memory are allocated (unless otherwise stated), but rather to provide a general view of the memory accessible by the computer system 1800 and how such is used.

As shown in FIG. 18B, the processor 1805 includes a number of functional modules including a control unit 1839, an arithmetic logic unit (ALU) 1840, and a local or internal memory 1848, sometimes called a cache memory. The cache memory 1848 typically includes a number of storage registers 1844-1846 in a register section. One or more internal busses 1841 functionally interconnect these functional modules. The processor 1805 typically also has one or more interfaces 1842 for communicating with external devices via the system bus 1804, using a connection 1818. The memory 1834 is coupled to the bus 1804 using a connection 1819.

The application program 1833 includes a sequence of instructions 1831 that may include conditional branch and loop instructions. The program 1833 may also include data 1832 which is used in execution of the program 1833. The instructions 1831 and the data 1832 are stored in memory locations 1828, 1829, 1830 and 1835, 1836, 1837, respectively. Depending upon the relative size of the instructions 1831 and the memory locations 1828-1830, a particular instruction may be stored in a single memory location as depicted by the instruction shown in the memory location 1830. Alternately, an instruction may be segmented into a number of parts each of which is stored in a separate memory location, as depicted by the instruction segments shown in the memory locations 1828 and 1829.

In general, the processor 1805 is given a set of instructions which are executed therein. The processor 1805 waits for a subsequent input, to which the processor 1805 reacts to by executing another set of instructions. Each input may be provided from one or more of a number of sources, including data generated by one or more of the input devices 1802, 1803, data received from an external source across one of the networks 1820, 1822, data retrieved from one of the storage devices 1806, 1809 or data retrieved from a storage medium 1825 inserted into the corresponding reader 1812, all depicted in FIG. 18A. The execution of a set of the instructions may in some cases result in output of data. Execution may also involve storing data or variables to the memory 1834.

The disclosed image processing arrangements use input variables 1854, which are stored in the memory 1834 in corresponding memory locations 1855, 1856, 1857. The image processing arrangements produce output variables 1861, which are stored in the memory 1834 in corresponding memory locations 1862, 1863, 1864. Intermediate variables 1858 may be stored in memory locations 1859, 1860, 1866 and 1867.

Referring to the processor 1805 of FIG. 18B, the registers 1844, 1845, 1846, the arithmetic logic unit (ALU) 1840, and the control unit 1839 work together to perform sequences of micro-operations needed to perform "fetch, decode, and execute" cycles for every instruction in the instruction set making up the program 1833. Each fetch, decode, and execute cycle comprises:

(i) a fetch operation, which fetches or reads an instruction 1831 from a memory location 1828, 1829, 1830;

(ii) a decode operation in which the control unit 1839 determines which instruction has been fetched; and (iii) an execute operation in which the control unit 1839 and/or the ALU 1840 execute the instruction.

Thereafter, a further fetch, decode, and execute cycle for the next instruction may be executed. Similarly, a store cycle may be performed by which the control unit 1839 stores or writes a value to a memory location 1832.

Each step or sub-process in the processes of FIGS. 2 to 17 and 19 to 25 is associated with one or more segments of the program 1833 and is performed by the register section 1844, 1845, 1846, the ALU 1840, and the control unit 1839 in the processor 1805 working together to perform the fetch, decode, and execute cycles for every instruction in the instruction set for the noted segments of the program 1833.

Some parts of the image processing methods may alternatively be implemented in dedicated hardware such as one or more integrated circuits performing the functions or sub functions of the desire image processing. Examples of such dedicated hardware may include graphic processors, digital signal processors, or one or more microprocessors and associated memories, for example to assist in preforming Fourier transformations of images.

Figure 2:
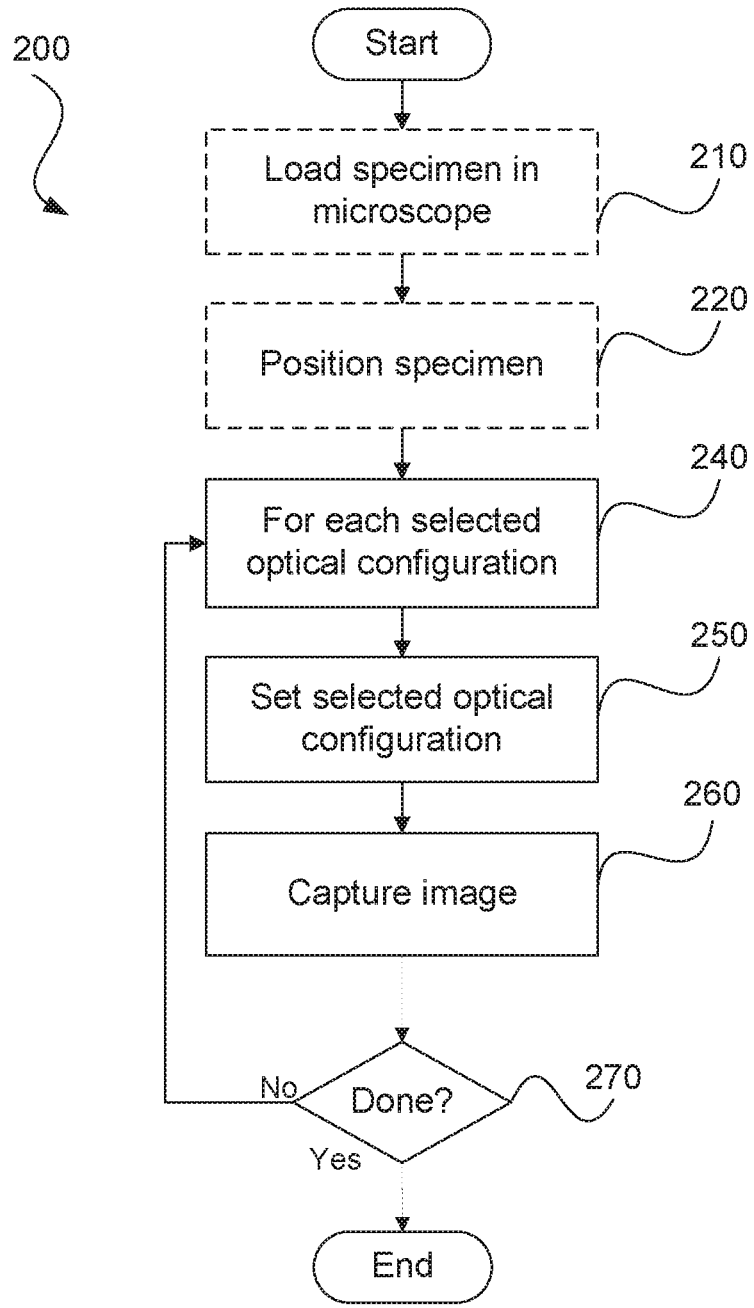
FIG. 2 is a schematic flow diagram of a process for capturing FPM images.
Figure 3:
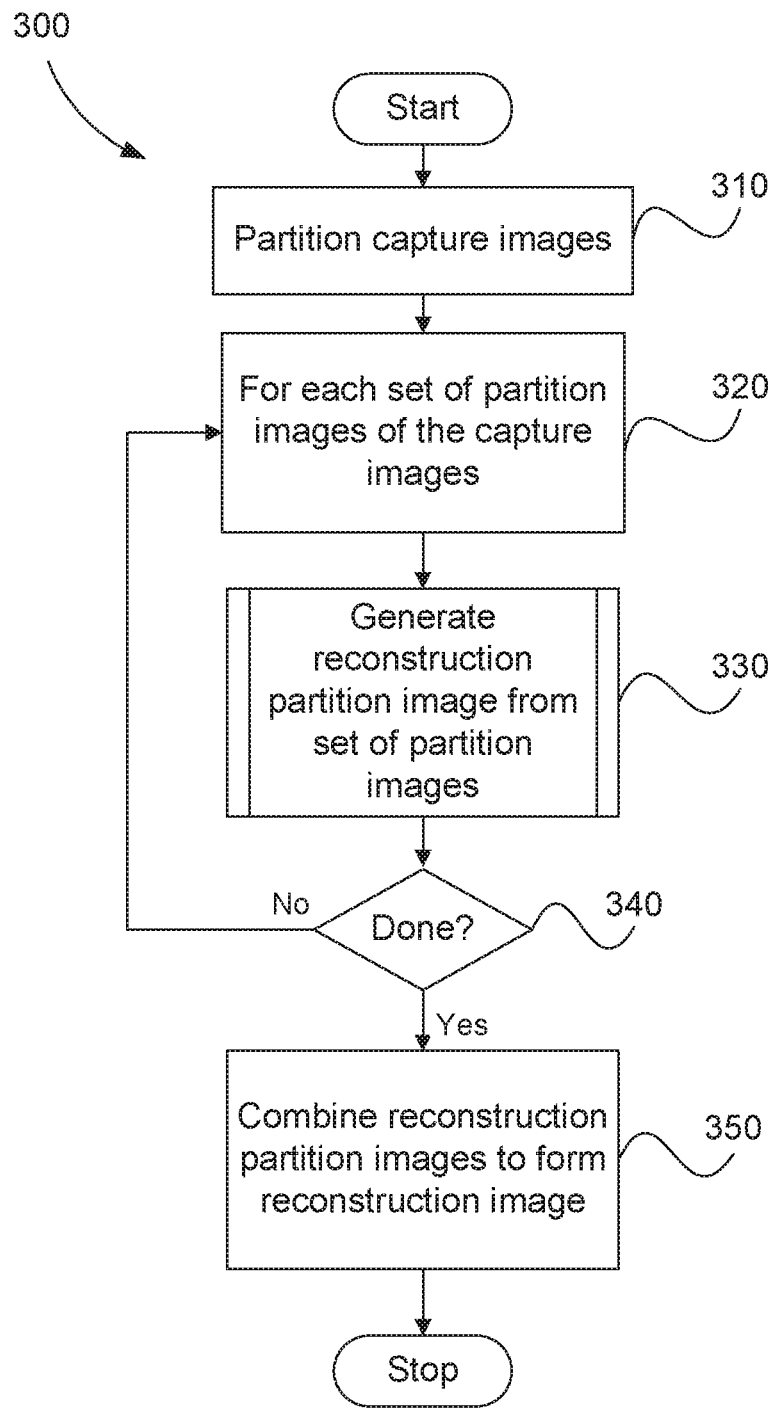
FIG. 3 is a schematic flow diagram of a method of generating a combined spectrum image of a specimen from the set of partial spectrum images captured by the Fourier Ptychographic Microscopy system.

A general overview of a process 200 that can be used to capture FPM images of a sample by Fourier Ptychographic imaging is shown in FIG. 2. A general overview of a process 300 to generate a combined spectrum image of the sample by processing the FPM captured images is shown in FIG. 3. The processes 200 and 300 include various steps some of which may be manually performed, or automated, and certain processing steps, that may be performed using the computer system 1800 in FIG. 18A. Such processing is typically controlled via a software applications executable by the processor 1805 of the computer 1801 to perform the Ptychographic imaging.

In the process 200, at step 210, a specimen may optionally be loaded onto the microscope stage 114. Such loading may be automated. In any event, a specimen 102 is required to be positioned for imaging. Next, at step 220, the specimen may be moved to be positioned such that it is within the field of view of the microscope 101 around its focal plane. Such movement is optional and where implemented may be manual, or automated with the stage 114 under control of the computer 1801. Next, with a sample appropriately positioned, steps 240 to 260 define a loop structure for capturing and storing a set of images of the specimen for a predefined set of multiple illumination configurations of the whole slide incorporating the specimen 102. In general this will be achieved by illuminating the specimen from a specific position or at a specific angle. In the case that the variable illuminator 108 is formed of a set of LEDs such as an LED matrix, this may be achieved by switching on each individual LED in turn. The order of illumination may be arbitrary, although it is preferable to capture FPM images in the order in which they will be processed (which may be in order of increasing angle of illumination). This minimises the delay before processing of the captured FPM images can begin if the processing is to be started prior to the completion of the FPM image capture.

Step 250 sets the next appropriate illumination configuration, then at step 260 a FPM image 104 is captured on the camera 103 and stored on data storage 106 (such as the HDD 1810 of FIG. 18A). The captured image 104 may be a high dynamic range image, for example a high dynamic range image formed from one or more images captured over different exposure times. Appropriate exposure times can be selected based on the properties of the illumination configuration. For example, if the variable illuminator is an LED matrix, these properties may include the illumination strength of the LED switched on in the current configuration.

Step 270 checks if all the illumination configurations have been selected, and if not processing returns to step 240 for capture at the next optical configuration. Otherwise when all desired configurations have been captured, the method 200 is complete.

A method 300 to generate a reconstructed or combined spectrum image 110 from the set of captured FPM images 104 will now be described in further detail below with reference to FIG. 3. The method 300 is preferably performed by execution of a software application by the processor 1805 operating upon images stored in the HDD 1810, whilst using the memory 1806 for intermediate temporary storage.

Figure 4A:
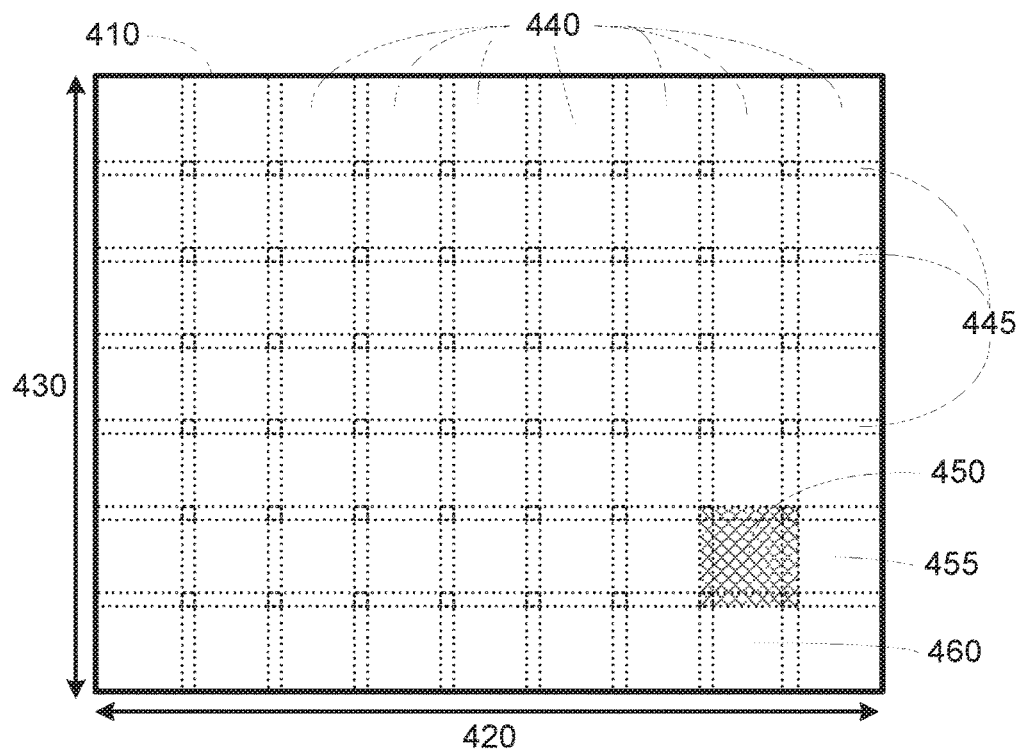
FIGS. 4A and 4B illustrate an exemplary partitioning of the captured partial spectrum images that may be used at step 310 of method 300 of FIG. 3.
Figure 4B:
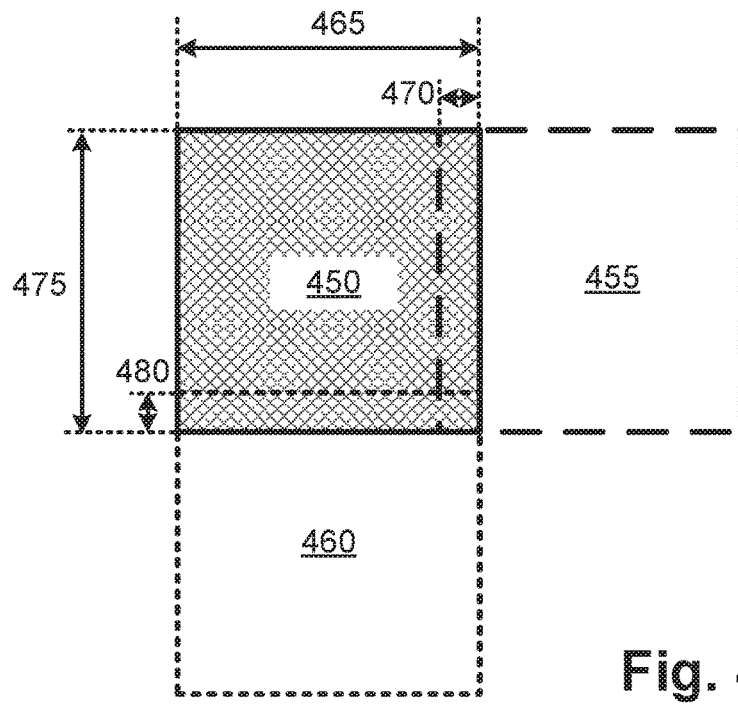

Method 300 starts at step 310 where the processor 1805 retrieves a set of captured FPM images 104 of the specimen 102 and spatially partitions each of the captured images 104. FIGS. 4A and 4B illustrate a suitable partitioning of the images. The rectangle 410 in FIG. 4A represents a single captured image 104 of size formed by a width 420 and a height 430. The sizes would typically correspond to the resolution (e.g. 5616 by 3744 pixels) of the sensor in the camera 103. In step 310, the rectangle 410 may be partitioned into equal sized square regions 440 on a regular grid with an overlap between each pair of adjacent partitions 445. The cross hashed partition 450 is adjacent to partition 455 on the right and 460 below, and an expanded view of these three partitions is shown in FIG. 4B. Each illustrated spatial partition has size dimension 465 by size dimension 475, which typically may be, for example 150×150 pixels (i.e. where dimension 465=150 pixels, and dimension 475=150 pixels). The overlapping regions 470 and 480 in the x- and y-dimensions respectively have a suitable size, which may be 10 pixels.

The overlapping regions may take different sizes over the capture images 104 in order for the partitioning to cover the field of view exactly. Alternatively, the overlapping regions may be fixed in which case the partitioning may omit a small region around the boundary of the captured FPM images 410. The size of each partition and the total number of partitions may be varied to optimise the overall performance of the system in terms of memory use and processing time. A set of partition images is formed corresponding to the geometry of a partition region applied to each of the set of captured images. For example, the partition 450 may be selected from each capture image covering the same spatial region of the slide to form one such set of partitions.

Steps 320 to 340 define a loop structure that processes the sets of partitions of the captured images in turn. The sets of partitions may be processed in parallel for faster throughput. Step 320 selects the next set of partitions of the capture images. Step 330 then generates reconstruction partition image from the set of partition images. Each reconstruction partition image may be temporarily stored in memory 1806 or 1810. This step will be described in further detail with respect to FIG. 5 below. Each reconstruction partition image is essentially a partition corresponding to a corresponding region 440 of each of the captured images, but at a higher resolution. Also, the reconstruction partition images are complex, having phase information. Step 340 checks if all sets of partition images of the captured images have been processed, and if so processing continues to step 350, otherwise processing returns to step 320.

At step 350, the set of reconstruction partition images, including one reconstruction partition image formed corresponding to each partition region, are combined to form a single combined spectrum image 110. The combined spectrum image 110 may be alternatively or additionally be termed a reconstruction image as indicated in the drawings in view of the particular nature of the processing of the method 300 of FIG. 3 by which the image 110 is formed. A suitable method of combining the images may be understood with reference to FIG. 4A. A combined spectrum image corresponding to the capture image field of view covered by the partition sets is defined, where the combined spectrum image is up-scaled relative to the capture image by the same factor as the upscaling of the reconstruction partition images relative to the partition images. Each reconstruction partition image is then composited by the processor 1805 onto the combined spectrum image at a location corresponding to the partition location up-scaled in the same ratio. Efficient compositing methods exist that may be used for this purpose. Ideally, the compositing should blend the content of the adjacent reconstruction partition images in the overlapping regions given by the up-scaled equivalent of regions 445. Step 350 completes the processing of method 300. The reconstruction process of the method 300, whilst working upon spatial partitions of multiple images, operates to form a reconstructed image which has the combined spectral properties of the spatial partitions, and hence the name, combined spectrum image.

Figure 8A:
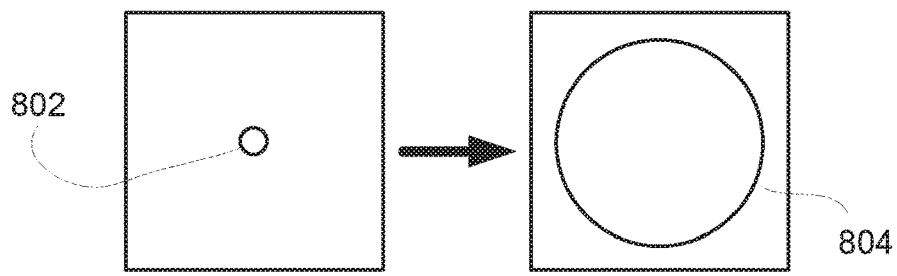
FIGS. 8A to 8C illustrate spatial arrangements of light sources as projected on a plane perpendicular to the optical axis and the corresponding transverse wavevectors.
Figure 8B:
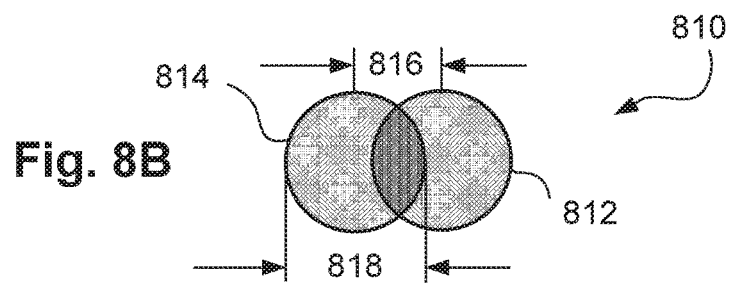
Figure 8C:
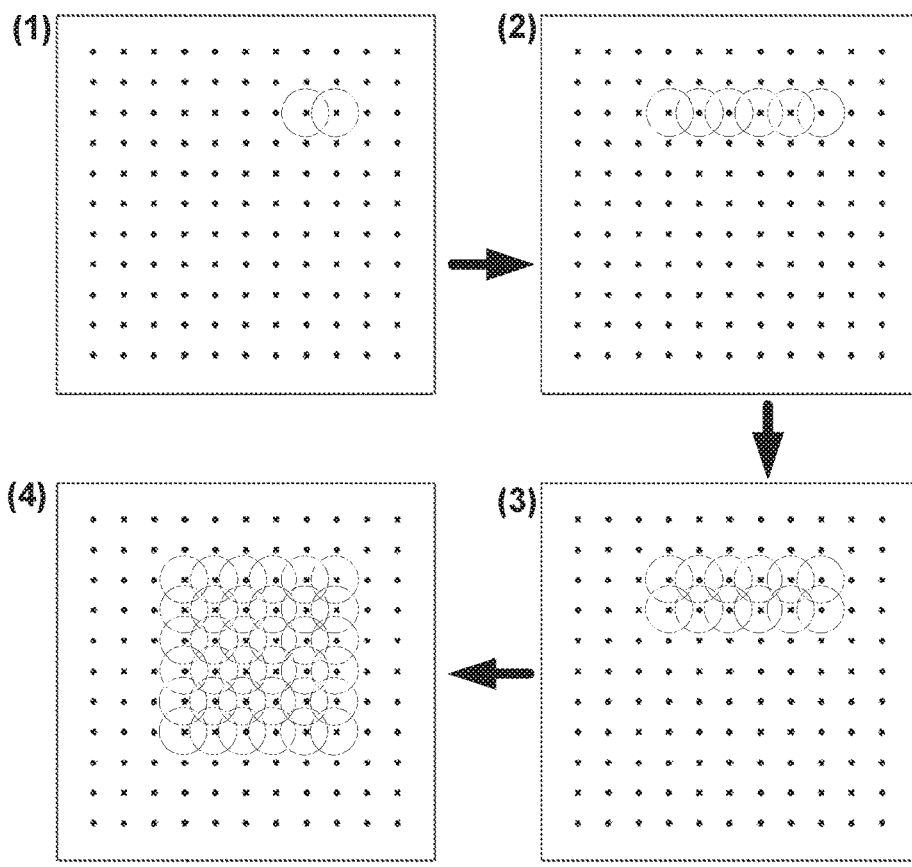

The arrangements described herein are operative to provide for a relatively inexpensive optical system (e.g. low NA lens, small aperture) which captures partial spectrum images, which spectrum is schematically represented by a small circle 802 in the Fourier representation of FIG. 8A, to emulate a relatively expensive system (e.g. with high NA lens), as schematically depicted by the large circle 804 also seen in FIG. 8A. This is achieved by mapping, in the Fourier space, spectral regions of the captured images according to a pattern and using relationships between adjacent spectral regions in the pattern to form a combined spectrum image. FIG. 8B shows two overlapping circles, where each circle is a spectral region representative of the Fourier components of a corresponding captured image at a particular illumination angle. The width 818 of each circle corresponds to the acceptance angle $\theta_F$ of the lens or other optical component, and the shift 816 between the adjacent circles is determined by the illumination angle, or more particularly the difference in the illumination angles of the captured images. FIG. 8C has parts (1) to (4) that show how multiple circles (from corresponding captured images) may be progressively mapped into an overlapping matrix to provide for emulating the relatively large acceptance angle of the large circle 804 seen in FIG. 8A. Fourier space, in which processing according to the presently described arrangements is performed, is defined in terms of transverse wavevector, which is related to the angle through a mapping.

Figure 5:
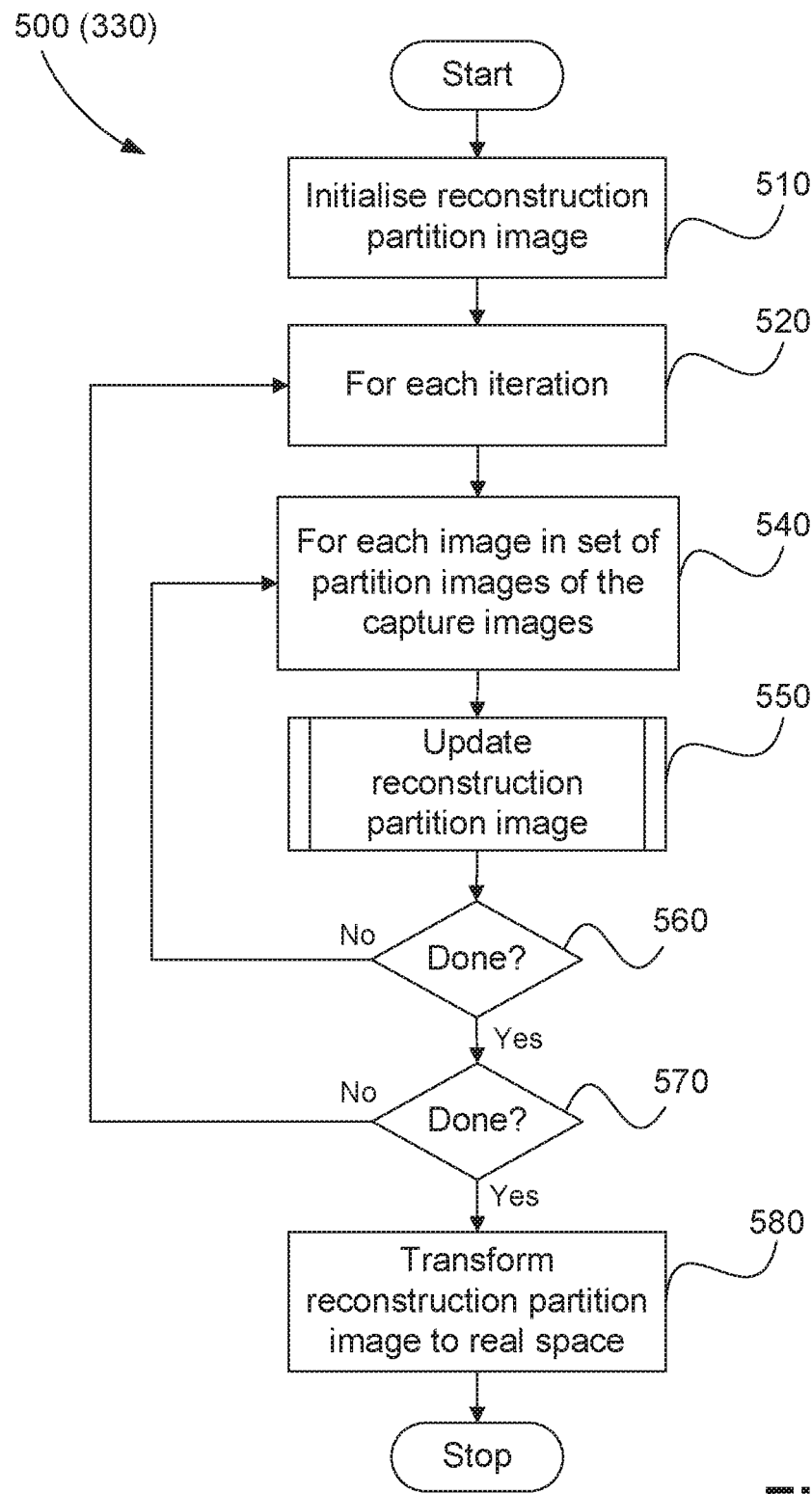
FIG. 5 is a schematic flow diagram of a method of generating a combined spectrum partition image from set of partial spectrum partition images.

Method 500, used at step 330 to generate a reconstruction partition image from set of partition images, will now be described in further detail below with reference to FIG. 5. The method 500 is preferably implemented using software executable by the processor 1805.

First at step 510, a reconstruction partition image is initialised by the processor 1805. The image is defined in Fourier space, with a pixel size that is preferably the same as that of the captured images transformed to Fourier space by a 2D Fourier transform. It is noted that each pixel of the initialised image stores a complex value with a real and imaginary component. The initialised image should be large enough to contain all of the Fourier space regions corresponding to the variably illuminated captured images, such as the region illustrated by the dashed circle in FIG. 7B.

It is noted that in alternative implementations, the reconstruction partition image may be generated with a size that can dynamically grow to include each successive Fourier space region as the corresponding captured image is processed.

Once the reconstruction partition image has been initialised in step 510, steps 520 to 570 loop over a number of iterations. The iterative updating is used to resolve the underlying phase of the image data to reduce errors in the reconstructed (combined spectrum) images. The number of iterations may be fixed, preferably somewhere between 4 and 15, or it may be set dynamically by checking a convergence criteria for the reconstruction algorithm.

Step 520 starts the next iteration, then steps 540 to 560 step through the images of the set of partition images of the capture images generated at step 310. Step 540 selects the next image from the set, and then step 550 updates, in the Fourier space, the reconstruction partition image based on the currently selected partition image of the set. This step will be described in further detail with respect to FIG. 6 below. Processing then continues to step 560 which checks if all images in the set have been processed, then returns to step 540 if they have not, or continues to step 570 where they have. From step 570, processing returns to step 520 if there are more iterations to perform, or continues to step 580 if the iterations are complete.

The final step 580 of method 500 involves the processor 1805 performing an inverse 2D Fourier transform on the reconstruction partition image to transform it back to real space.

Figure 6:
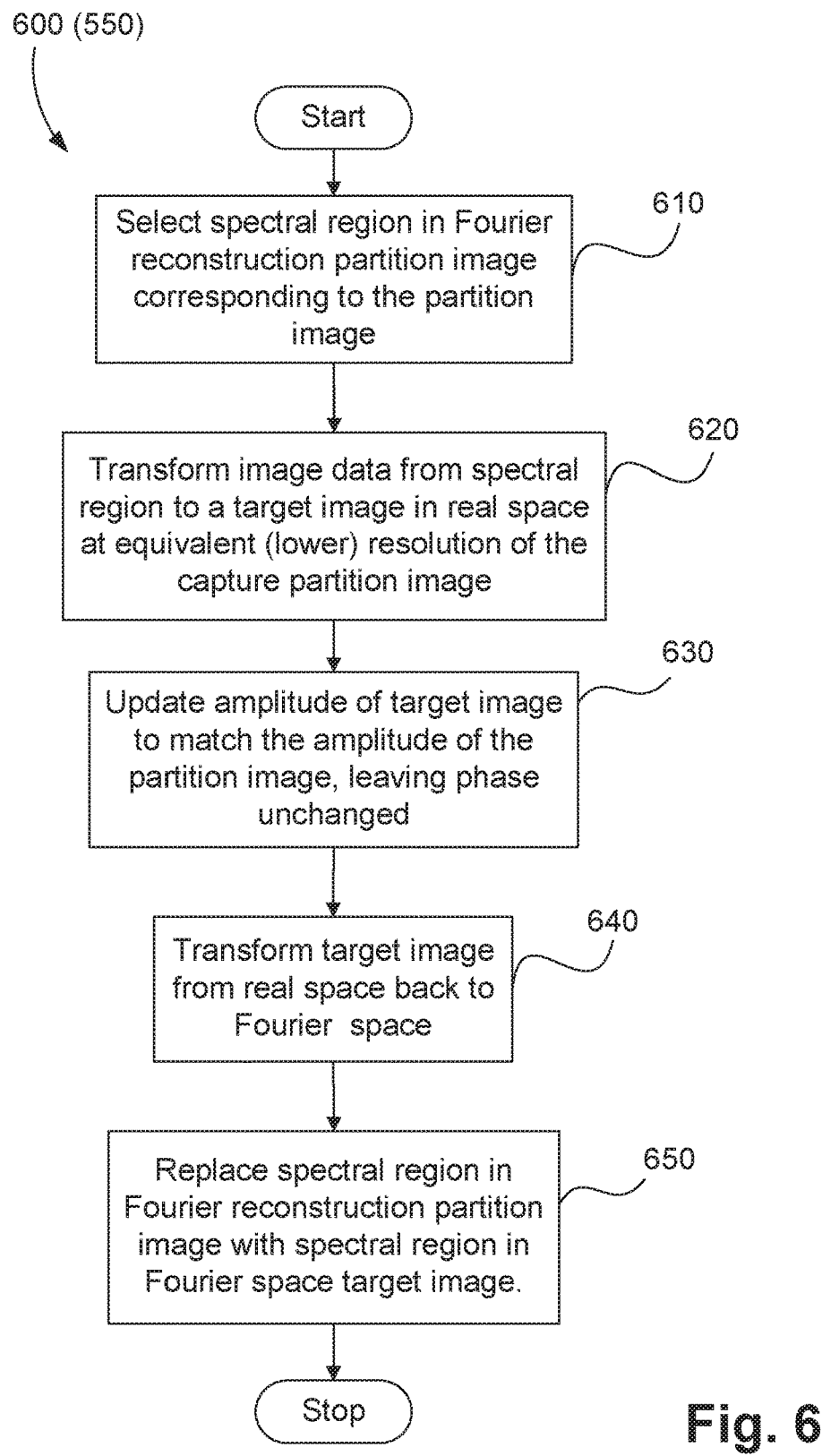
FIG. 6 is a schematic flow diagram of a method of updating an intermediate combined spectrum partition image based on a partial spectrum partition image.

Method 600, used at step 550 to update the reconstruction partition image based on a single partition image, will now be described in further detail below with reference to FIG. 6.

In step 610, the processor 1805 selects a spectral region in the reconstruction partition image corresponding to the currently selected partition image. This is achieved as illustrated in FIG. 7B which shows the Fourier space representations of a specimen, a dashed circle representing the spectral region 705 associated with a single capture image, and a transverse wavevector 710 shown by the solid arrow that corresponds to the configuration of the illumination. The spectral region 705 may be selected by allocating each pixel in the spectral representation of the reconstruction partition image as inside or outside the circular region, and multiplying all pixels outside the region by zero and those inside by 1. Alternatively, interpolation can be used for pixels near the boundary to avoid artefacts associated with approximating the spectral region geometry on the pixel geometry. In this case, pixels around the boundary may be multiplied by a value in the range 0 to 1.

It is noted that if the variable illuminator 108 does not illuminate with plane waves at the specimen 102, then the angle of incidence for a given illumination configuration may vary across the specimen, and therefore between different partitions. This means that the set of spectral regions corresponding to a single illumination configuration may be different for different partitions.

Optionally, the signal in the spectral region may be modified in order to handle aberrations in the optics. For example, the spectral signal may be multiplied by a phase function to handle certain pupil aberrations. The phase function may be determined through a calibration method, for example by optimising a convergence metric (formed when performing the generation of a higher resolution image for a test specimen) with respect to some parameters of the pupil aberration function. The pupil function may vary over different partitions as a result due to slight differences in the local angle of incident illumination over the field of view.

Next, at step 620, the image data from the spectral region is transformed by the processor 1805 from Fourier space to a real space to form a target image at equivalent resolution to the capture image partition. The spectral region may be zero-padded prior to transforming with the inverse 2D Fourier transform. The amplitude of the target image is then set to match the amplitude of the equivalent (current) partition image at step 630. The amplitude is obtained by taking the square root of the raw pixel intensity values of the (current) partition image. The complex phase of the target image is not altered at this step. The target image is then Fourier transformed at step 640 to give a spectral image. Finally, at step 650, the signal in the spectral region of the reconstruction partition image selected at step 610 is replaced with the corresponding signal from the spectral region in the spectral image formed at step 640 (the Fourier space target image). It is noted that in order to handle boundary related artefacts, it may be preferable to replace a subset of the spectral region that does not include any boundary pixels. If the signal in the spectral region was modified to handle aberrations at step 610, then a reverse modification should be performed as part of step 650 prior to replacing the region of the reconstruction partition image at this stage.

Overview

The specific arrangements disclosed herein image at least two microscopy slides by Fourier Ptychography. The computer module 105 employs an image registration method 900 of FIG. 9, according to an aspect of the present disclosure, to align a pair of reconstructed (combined spectrum) virtual slide images 110 so that they may be presented to a user such that common features are aligned to aid analysis of the virtual slide images 110. The slides will be referred to as sample A and sample B. The image registration method 900 processes the set of captured images to form a pair of reconstructed images along with registration information. The registration information generally takes the form of a distortion map that may be applied to one of the reconstructed images. In the following description, sample B is warped to be in visual registration with sample A. The set of captured FPM images include a set of images for which the optical configuration is similar. In this description the optical configuration refers to the illumination angle and/or scanning aperture that may be selected in order to set the transverse wavevector associated with a given image capture. Particularly, a particular illumination angle or a position of the scanning aperture can be encoded to specify which portion of the spectrum of the specimen is represented by the captured intensity image. This encoding may be in the form of the transverse wavevector associated with the capture image stored in the metadata or header of the image.

Images captured using the same, or similar, optical configuration represent image information corresponding to the same part of the spectrum and are therefore suitable for analysis by a registration algorithm. They may be captured using the same FPM device, or may be captured using independent FPM devices. The captured images may be used to form the registration information for the pair of slides independently from or prior to the reconstruction, thus allowing for registration of the samples to be performed in parallel with reconstructing at least one of these samples.

The display system 107 (1814) displays the whole or parts of the virtual slide images 110. The computer module 105 (1801) can additionally process the information on the virtual slide image 110 before presentation to the user to enhance the image. This processing could take the form of changing the image appearance to give diagnostic assistance to the user, and/or other potential enhancements. Furthermore, the display system 107 may display one or more virtual slide images 110 simultaneously.

First Arrangement

Figure 9:
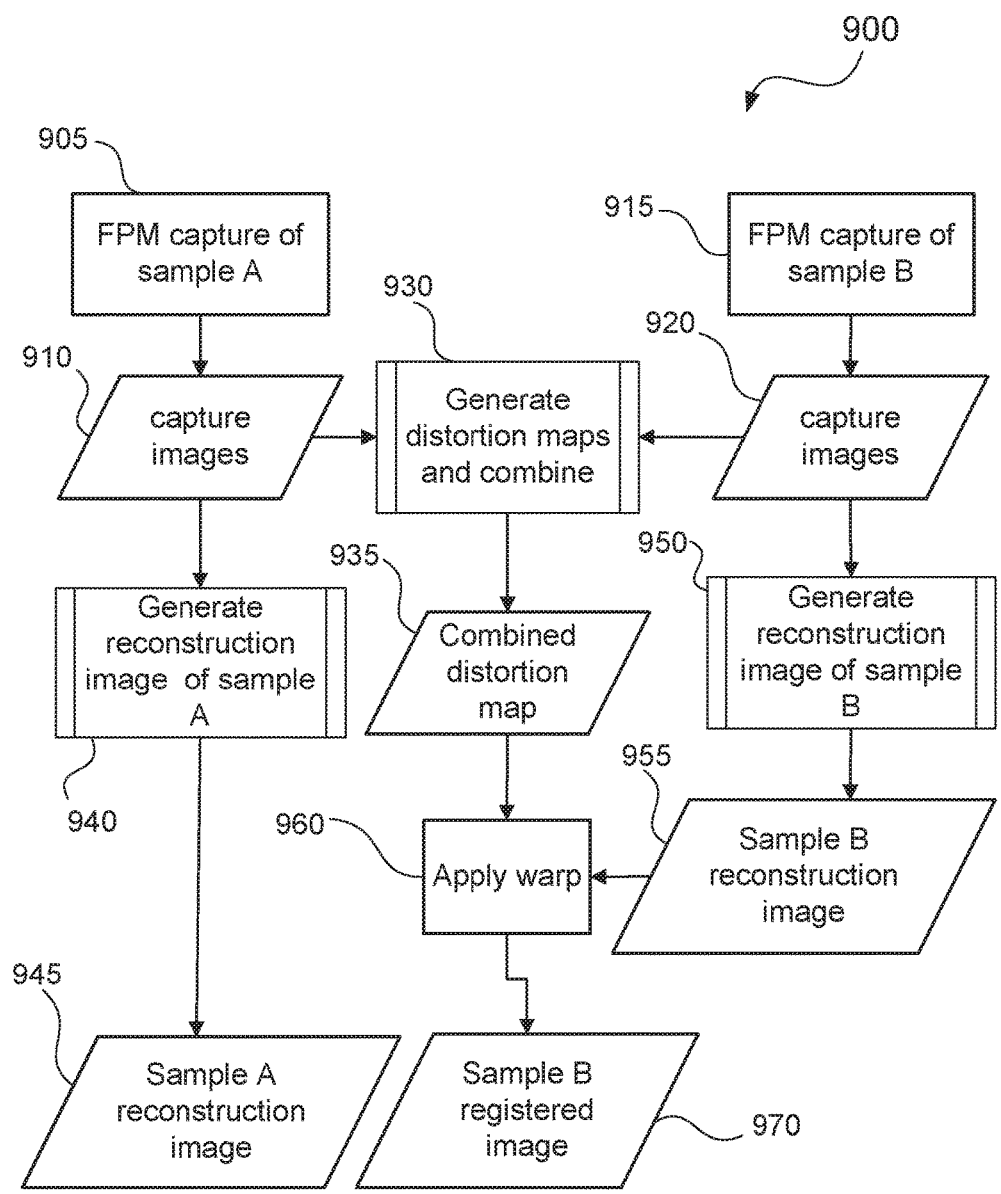
FIG. 9 is a schematic block diagram of a data processing architecture according to one specific arrangement.

FIG. 9 is a schematic representation of a data processing architecture of an implementation of image registration according to the present disclosure. An FPM is used at step 905 to capture multiple images 910 with different optical configurations of a first specimen (sample A) mounted on a slide. Similarly multiple images 920 are captured of a second specimen (sample B) mounted on another slide using an FPM step 915. The images 910 and 920 are spatial images, with each image corresponding to a narrow band of frequencies. Together, the images 910 and the images 920, combine respectively to give a combined spectral image. As such each of the individual images of the images 910 and 920 represent partial spectrum images. At least one pair, and preferably multiple pairs, of images of sample A and sample B which correspond to the same optical configurations are selected as inputs into a geometric distortion estimation and combination process 930 to obtain a combined distortion estimate 935, in the form of a combined distortion map. The partial spectrum images of each pair are spectrally matching, as they were captured under the same or substantially identical optical configurations, whilst all pairs are spatially matching. Desirably capture under the same optical configuration includes substantially the same illumination setting. The partial spectrum images for the pair(s) can be selected to generally correspond to optical configurations for which the spectral information is relatively low (i.e. the transverse wavevectors relate to low frequency portions of the image). The process 930 operates to align images derived from one or more of the pairs of corresponding partial spectrum images. A suitable method 1400 for performing step 930 will be described in further detail with respect to FIG. 14 below.

In a specific implementation, a first partial spectrum image associated with the first slide is selected and a corresponding partial spectrum image of the second slide is then identified. The identification can be performed by identifying a first illumination condition associated with the first spectrum image, used during the capture 905, and then analysing illumination conditions used during the capture 915 of the images 920 of the second slide. A comparison of the illumination conditions associated with the capture 915 of the images 920 of the second slide with the first illumination condition can then be used to select a similar illumination condition. With the selected similar illumination condition, an associated intensity image (second spectrum image) from the second plurality of images can then be selected, to thereby form a single pair of the first and second spectrum images. The FPM captured images 910 of sample A are used as input to a phase recovery process 940 (such as the method 300 previously described) to effectively reconstruct a combined spectrum image 945 of sample A. Similarly, the captured FPM images 920 of sample B are selected as input to a phase recovery process 950 (again the method 300) to effectively reconstruct a combined spectrum image 955 of sample B. The combined distortion estimate (distortion map) 935 is applied by process 960 to the reconstructed combined spectrum image 955 to thereby obtain an image 970 of sample B which is registered with the image 945 of sample A.

From the arrangement of FIG. 9, it will be appreciated that a physician may be able to perform a medical diagnosis based upon either one or both of the reconstruction images 945 and 955. Further, the system 100 may send the output distortion map to a corresponding display device 1814 for displayed reproduction so that it can be analysed by a clinician. Side-by-side reproduction of the images, such as the distortion map and one or more of the combined spectrum images may be used to supplement diagnosis and/or errors in the images. For example, such can highlight areas of high distortion in the combined spectrum images. Through application of the distortion map with at least one of the reconstruction images 945,955, for example to determine the registered image 970, affords greater imaging options to the physician to thereby facilitate further medical diagnosis using the images 945 and 970. For example, the arrangements afford the opportunity to highlight the extent of warp in the distortion map. This can be used to indicate that the captured image data is unreliable, for example, for the purposes of computer-aided diagnosis, particularly for cases of excessive warp that may not be correctable by registration within acceptable limits. As discussed above, for a natural specimen, different regions of an object spectrum are not completely independent, however, they are also not completely dependent. It is generally not possible to accurately estimate the full object spectrum of such a specimen given the signal over a restricted region or set of regions of the spectrum. Therefore, the FPM captured images corresponding to different optical configurations differ in information content. This would be expected to be true even if the spectral regions partly overlap, as might be expected in the case of FPM capture images corresponding to adjacent wavevectors. The on-axis FPM captured image (or DC image or zero transverse wavevector image) appears as a low passed filtered, down-sampled version of the high resolution image. FPM images for other optical configurations appear band pass filtered, with the higher frequency pass bands centred on the transverse wavevector corresponding to the optical configuration. Spatial structure is modified by the band pass filter effect, resulting in a gradient-like image. For example, an edge with a step-wise intensity change may appear as a line. However, important structural information remains spatially localised and capable of generating an appropriate distortion map.

The different parts of the spectrum can be considered to be partially independent, so that the distortion maps from different parts of the spectrum are also partially independent. As a consequence, distortion maps obtained from different FPM image pairs are likely to have different, independent errors. Therefore, by combining distortion maps having independent error, a more accurate distortion map estimate may be produced. This assumption can be verified by calculating distortion maps from simulated Lest data for a synthetic specimen and checking the accuracy of the distortion maps against the known simulation ground truth. For a realistic synthetic specimen, the accuracy of the warp estimate improves when combining distortion maps derived from multiple different partial spectrum images.

The low resolution combined distortion map (935) generated from low resolution partial spectrum images (910, 920) is suitable for registration of high resolution images (e.g. 955) as the distortion is expected to be generally smooth and amenable to interpolation.

For some applications, it may not be necessary to apply the distortion map 935 to the combined spectrum image of sample B. The distortion map 935 may be used to indicate the difference between samples A and B. For example, the distortion map 935 may be presented visually along with the reconstructed images of samples A 945 and B 955 so that clinicians can easily identify and investigate in greater detail differences between the samples. Alternatively the distortion map 935 may be generated before the reconstructed images of either or both of sample A 945 and B 955 are generated.

Additionally, each low resolution distortion map 935 may have an associated confidence score or measure and these may be used to select the best set of distortion maps to combine together to form a combined distortion map. The confidence scores may also be used to determine whether that combined distortion map is of a sufficiently high quality for use in generating registered reconstructed images.

There are some constraints on the specimen capture images that must be met if they are to be accurately aligned. If there is not sufficient structural similarity between the slides then the alignment can fail. When processing according to the invention, it is important that each pair of capture images include enough structural similarity, that is to say that there is sufficient structural similarity within each spectrally band limited image pair that the alignment may be performed. In the case that a particular spectral region does not include such information then the corresponding capture images should not be included in the alignment. If the specimen slides are taken from sequential layers of a tissue specimen with the same stain and a sufficiently small interlayer spacing, then we would expect the amount of structural similarity to be larger at lower spatial frequencies than at higher spatial frequencies. This is why it is better to use a set of image capture pairs corresponding to lower spatial frequencies (e.g. those captured with angles of illumination closer to the optical axes in the case of angled illumination FPM).

Figure 10A:
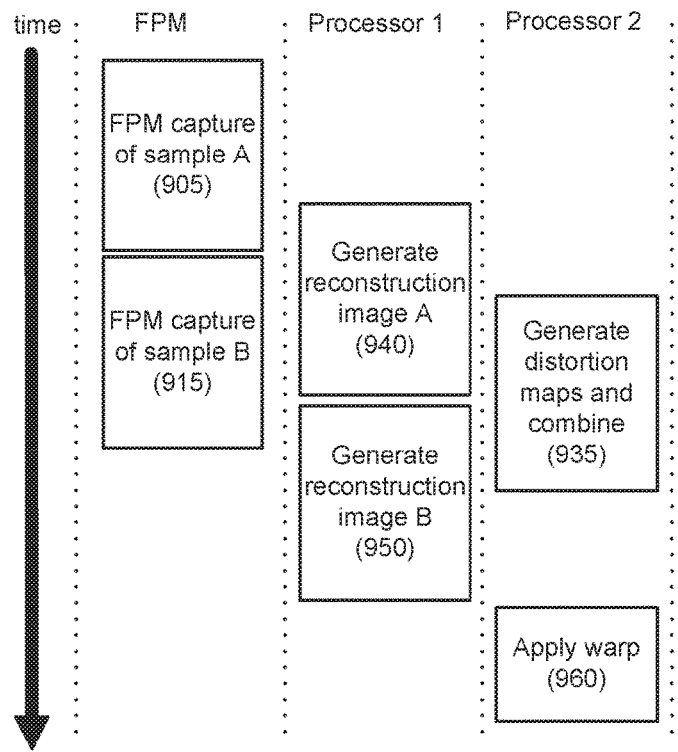
FIGS. 10A and 10B represent processing flows for the arrangement of FIG. 9 which includes parallel execution.

FIG. 10A illustrates the processing timing and synchronisation for a system in which there is a single FPM device and two processors that may be used to perform the various processing steps of method 900. This for example could be where the processor 1805 is a dual-core processor, or two processors 1805 are used within the computer 1801. The vertical axis of FIG. 10A represents time, such that the height of each processing step corresponds to the relative or comparative processing time. The exact processing time of each step will depend on many configuration parameters of the FPM including the number and optical configurations associated with the images, and also on various parameters used in the FPM reconstruction and distortion map generation steps.

As seen in FIG. 10A, the FPM captures firstly images of sample A corresponding to step 905, and then of sample B for step 915. The generation of a combined spectrum image of sample A at step 940 can commence on processor 1 when sufficient FPM images of sample A have been captured (i.e. after or slightly before the end of process 905). Once this step is completed, and assuming sufficient FPM images of sample B have been captured, processor 1 can proceed with the generation of a combined spectrum image of sample B according to step 950. The generation of distortion maps 935 can be performed on processor 2 in parallel with the reconstruction on processor 1. This distortion map generation may be performed once relatively small subsets of the FPM images of both samples have been captured as illustrated in FIG. 10A. The finish time of distortion map generation seen in FIG. 10A is illustrative relative to step 915. Conclusion of distortion map generation may in some implementations occur before the end of complete capture of FPM images. When the reconstruction of each image is complete (conclusion of each of steps 940 and 950), processor 2 can then apply the distortion map to the reconstructed images in step 960. As illustrated in FIG. 10A, application of the warp (distortion map) in step 960 commences after the reconstruction of image sample B in step 950. If the distortion map were to be applied to the reconstruction of image sample A (from step 940), then such application could commence in this example immediately after the generation of the distortion map in step 935 (not illustrated).

Figure 10B:
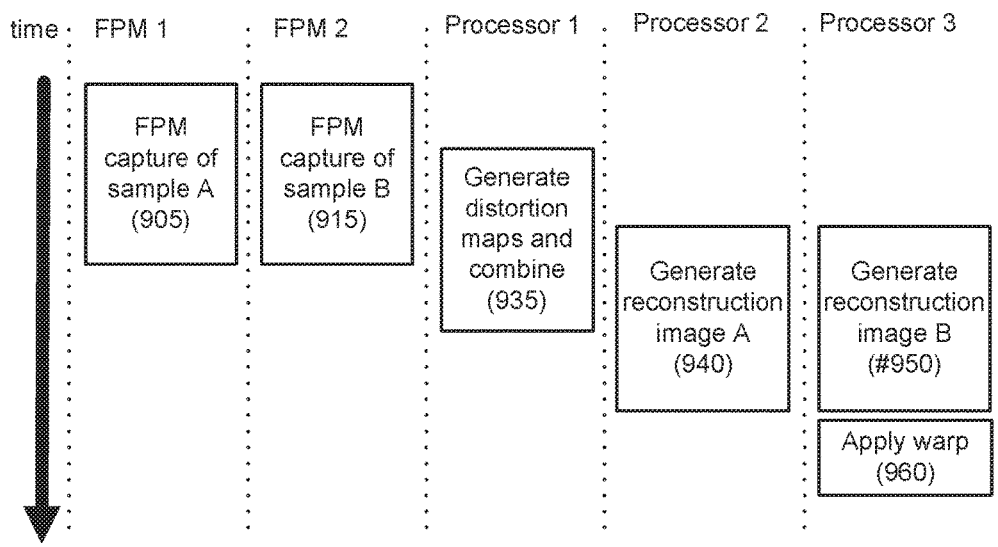

FIG. 10B illustrates the processing timing and synchronisation for a system in which there are two FPM devices and three processors that may be used to perform the various processing steps of method 900. The three processors for example may be parts of a quad-core processor. In FIG. 10B the two FPMs simultaneously capture FPM images of sample A at step 905 and of sample B at step 915. Processor 1 starts to generate a distortion map once sufficient FPM images of samples A and B have been captured, e.g. as discussed below with reference to FIG. 25. Processors 2 and 3 can then start to generate reconstructed images of samples A at step 940 and of sample B at step 950 essentially simultaneously or concurrently after sufficient FPM images of sample A and B, respectively, have been captured. Once the sample B image has been reconstructed, the distortion map may already have been generated and can be applied according to step 960. It is clear that many variants of the processing flow appropriate to this implementation may be used. Alternative numbers of processors and arrangements of processing steps among the processors may be used. For example, the apply warp step 960 in FIG. 10B may be performed on any of the 3 processors.

Figure 11:
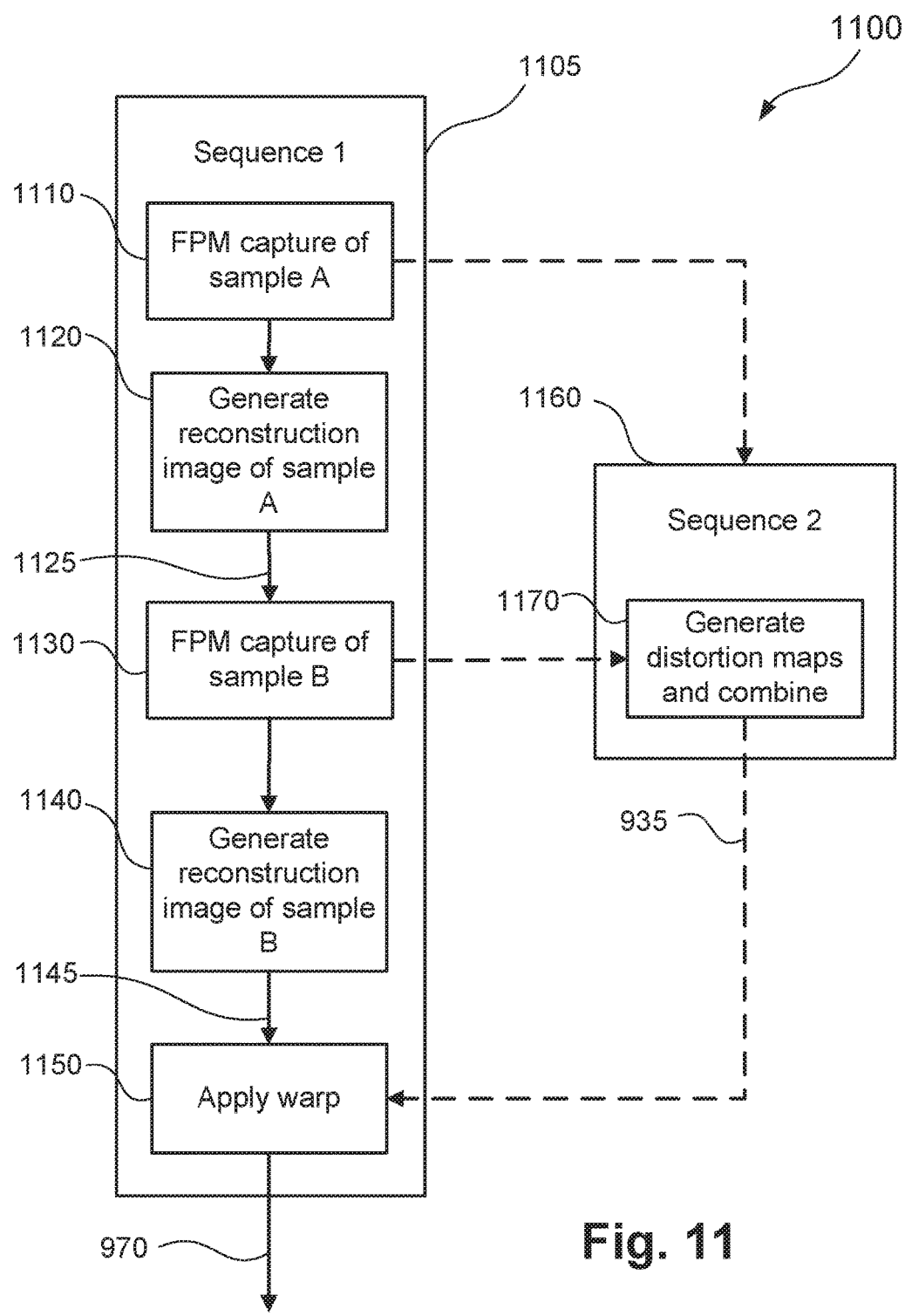
FIG. 11 is a schematic flow diagram of a method of registering two combined spectrum images which includes parallel execution.

FIG. 11 is a schematic flow diagram of an arrangement 1100 related to FIG. 9. This arrangement 1100 is suitable when a single FPM is used to acquire images of sample A and sample B. A first execution sequence 1105, comprises steps 1110, 1120 1130, 1140 and 1150 and can be executed, for example, on a first processor. A second execution sequence 1160 comprises the step 1170 and can be executed in substantial parallel on a second processor. The processors are in communication, for example, the second processor can receive captured images from the FPM device which is coupled to each of the first processor and the second processor. Additionally, the second processor can communicate the result distortion map back to the first processor for further processing, for example, to apply the distortion map to the combined spectrum image or highlight highly distorted areas. Alternatively or additionally, the second processor can send the output distortion map to a corresponding display device 1814 for displayed reproduction so that it can be analysed by a clinician. Side-by-side reproduction of the images, such as the distortion map and one or more of the combined spectrum images may be used to highlight areas of high distortion in the combined spectrum images.

At step 1110, FPM images 910 of sample A are captured using the FPM as described in the method 200. At step 1120 a combined spectrum image 1125 of sample A 945 is generated as described in the method 300 using the captured images 910. At step 1130, FPM images 920 of sample B are captured as described in the method 200. The captured FPM images 910 and 920 are passed to the second execution sequence 1160, operating in parallel with the first execution sequence. In step 1170, the second execution sequence generates a combined distortion map 935 which is sent to step 1150 of the first execution sequence. Following step 1130 the first execution sequence continues at step 1140 to generate a combined spectrum image of sample B 955 using the captured FPM images 920 as described in the method 300. At step 1150 the combined spectrum image of sample B 955 is warped based on the image distortion map 935 received from step 1170 by mapping positions from every pixel coordinate in the combined spectrum image of sample A to coordinates in the combined spectrum image 1145 of sample B. As an alternative (not illustrated), step 1150 can apply the distortion map 935 to the combined spectrum image 1125 of sample A. Subsequently, pixel values are interpolated in the combined spectrum image 1145 of sample B using the mapped positions, and a distorted image 970 is constructed of the same size as the combined spectrum image 1125 of sample A but which contains interpolated values from the combined spectrum image 1145 of sample B. Cubic interpolation is desirably used for interpolation during warping and produces acceptable image quality. However, it will be understood that other interpolation techniques, such as bilinear, sinc or spline interpolation may also be used without departing from the scope of the present disclosure.

The above arrangements afford a number of benefits. Firstly they provide for the generation of the distortion map while the reconstruction processes are being performed. Further, the arrangements provide for the ability to perform a warp while reconstructing, for example from FIG. 10A as discussed, the warp can be applied to the reconstruction of sample A whilst sample B is being reconstructed.

Upon calculation of the warped combined spectrum image 970, further processing can occur on the registered image, or the two images (i.e., the combined spectrum reconstructed of sample A and the registered combined spectrum image of sample B) may be viewed alternately by switching between the two images with their features aligned.

Figure 12:
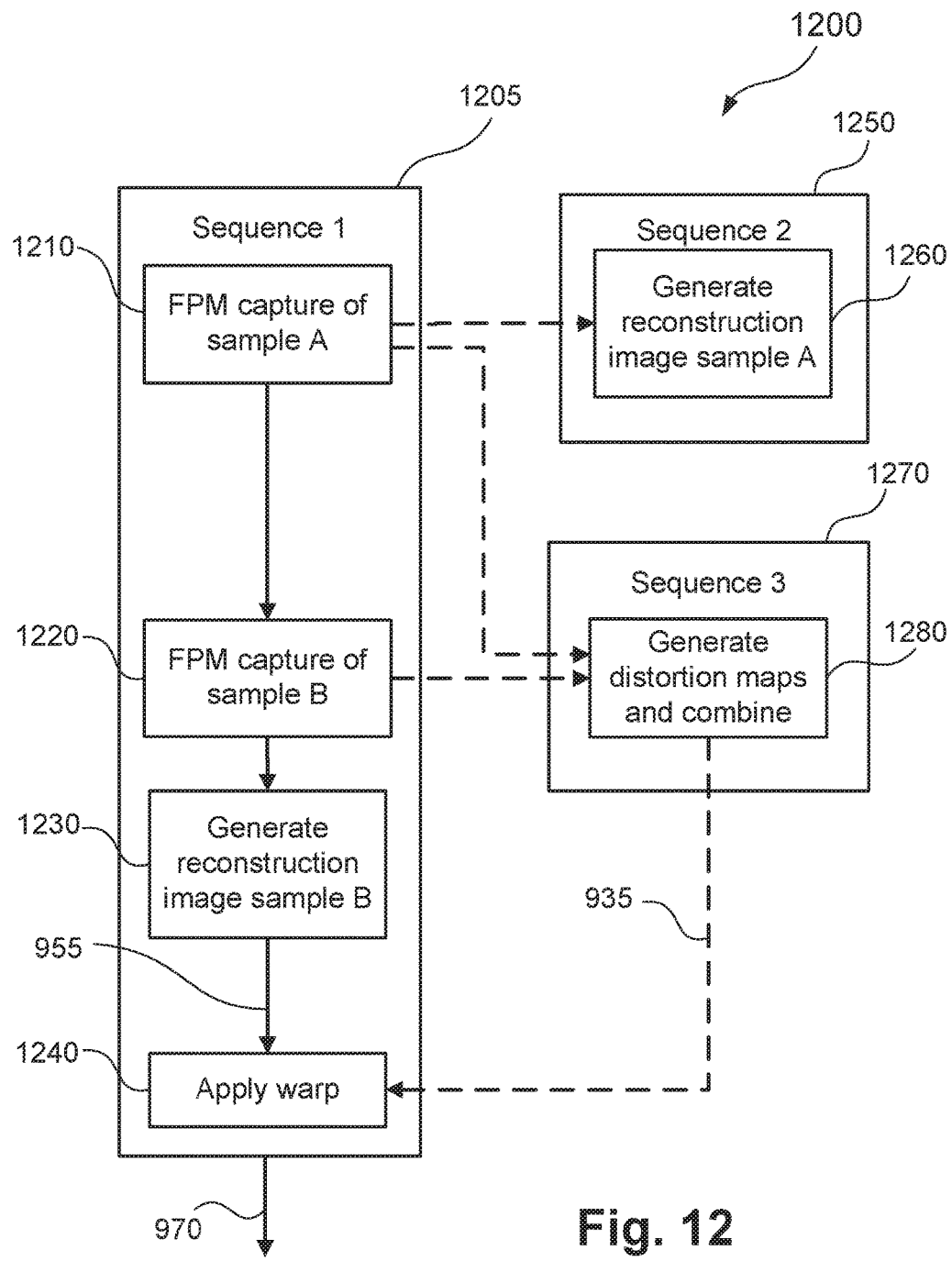
FIG. 12 is a schematic flow diagram of another method of registering two combined spectrum images which includes parallel execution.

FIG. 12 is an alternative schematic flow diagram to the arrangement 1100 of FIG. 11, whereby execution is performed in an arrangement 1200 having three parallel sequences. The arrangement 1200 allows for the generation of the reconstructed images for sample A and sample B to be performed in parallel in addition to the parallel generation of the distortion map. A first execution sequence 1205, comprises steps 1210, 1220 1230 and 1240 and is executed, for example, on the processor 2 as shown in FIG. 10B. A second execution sequence 1250 comprises the step 1260 and is executed, for example, on the processor 3 as shown in FIG. 10B. A third execution sequence 1270 comprises the step 1280 and is executed, for example, on the processor 1 as shown in FIG. 10B. The processors 1, 2 and 3 are in communication. For example, the processor 2 can receive captured images from the FPM device coupled with each of the processors. Additionally, the processor 1 can communicate the result distortion map back to the processor 3 for further processing.

At step 1210, FPM images 910 of sample A are captured using the FPM as described in the method 200. The captured FPM images 910 are passed, for example, as they are captured, to the second execution sequence 1250, and the third execution sequence 1270, operating in parallel with the first execution sequence. At step 1260, a combined spectrum image of sample A 945 is generated as described in the method 300 using the captured images 910. The step 1280 of the third execution sequence 1270 generates a combined distortion map 935 which is sent to step 1240 of the first execution sequence.

Following step 1210, the first execution sequence 1205 continues at step 1220 where FPM images 920 of sample B are captured as described in the method 200. At step 1230 a combined spectrum image of sample B 955 is generated as described in the method 300 using the captured images 920. At step 1240 the combined spectrum image of sample B 955 is warped based on the image distortion map 935 received from step 1280 by mapping positions from every pixel coordinate in the combined spectrum image of sample A to coordinates in the combined spectrum image of sample B.

Figure 13:
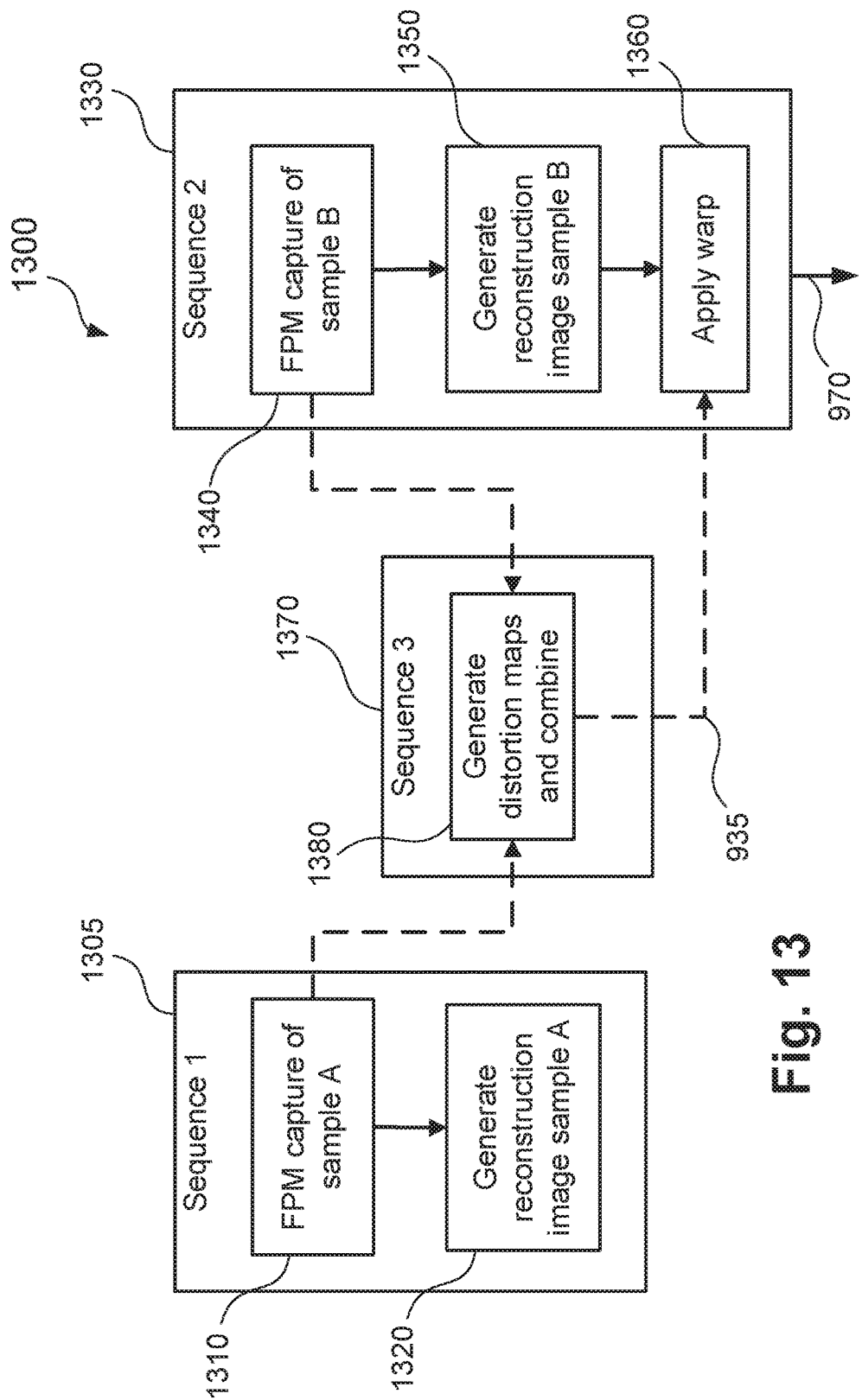
FIG. 13 is a schematic flow diagram of a third method of registering two combined spectrum images which includes parallel execution.

FIG. 13 is a schematic flow diagram of an arrangement 1300 related to FIG. 10B. The arrangement 1300 is suitable when a second FPM is used to acquire the images of sample B, allowing parallel capture. A first execution sequence 1305, comprises steps 1310 and 1320. A second execution sequence 1250 comprises the steps 1340, 1350 and 1360. A third execution sequence 1370 comprises the step 1380. The execution sequences are performed by corresponding processors which are in communication with each other, At step 1310 of the first execution sequence, FPM images 910 of sample A are captured using the FPM as described in the method 200. The captured FPM images 910 are passed to the third execution sequence 1370 operating in parallel with the first execution sequence. Following step 1310 the first execution sequence continues at step 1320 where a combined spectrum image of sample A 945 is generated as described in the method 300 using the captured images 910.

At step 1340 of the second execution sequence. FPM images 920 of sample B are captured using the FPM as described in the method 200. The captured images 920 are passed to the third execution sequence 1370 operating in parallel with the second execution sequence. The step 1380 of the third execution sequence generates a combined distortion map 935 which is sent to step 1360 of the second execution sequence. Following step 1340 the second execution sequence continues at step 1350 where a combined spectrum image of sample B 950 is generated as described in the method 300 using the captured images 920. At step 1360 the combined spectrum image of sample B 955 is warped based on the image distortion map 935 received from step 1380 by mapping positions from every pixel coordinate in the combined spectrum image of sample A to coordinates in the combined spectrum image of sample B, to form the registered image 970.

Figure 14:
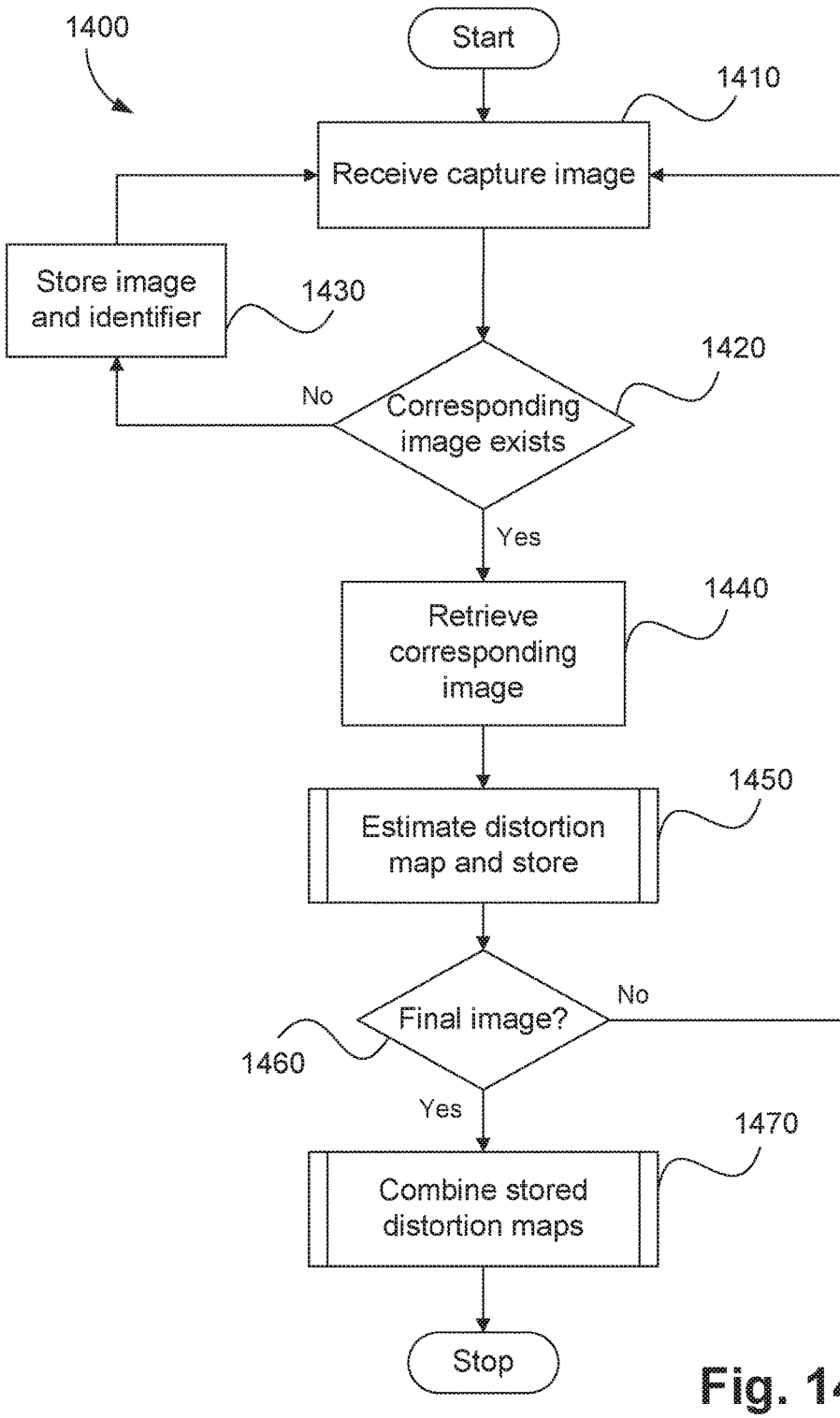
FIG. 14 is a schematic flow diagram of a method of generating and combining distortion maps based on partial spectrum images.

FIG. 14 is a schematic flow diagram of a process 1400 exemplifying of the processes 930, 1170, 1280 and 1380 used to generate a distortion map suitable for the registration of the combined spectrum image of sample B to the combined spectrum image of sample A. The process 1400 employs a loop structure to process, in turn, a set of captured FPM images of two samples (A and B) that are passed to the process 1400 and is performed by the processor 1805. The process 1400 commences when a captured FPM image is received at step 1410. In addition to the image, information is received which identifies the sample and the optical configuration used for capture. At step 1420 the processor 1805 operates to determine whether a corresponding image from the other sample with the same optical configuration has already been stored. If not, the image, sample ID and optical configuration information are temporarily stored at step 1430, for example in the memory 1806, for retrieval at a subsequent step 1440, and execution resumes at step 1410. If it is determined at step 1420, that a corresponding image from the other sample exists, step 1440 retrieves the image which was previously stored (at step 1430). At step 1450 the two captured FPM images are used to estimate a distortion map. It is preferred that the amplitude of the captured images is used for estimation of the distortion map, although the intensity may be used in some cases. As previously noted, the amplitude is obtained by taking the square root of the raw pixel intensity values.

A suitable method of estimating the distortion map uses gradient-based methods and operates to fit low-frequency DCT coefficients to generate a candidate smooth distortion map, which is applied to the second image to register the second image to the first image. To provide greater accuracy, this method is iterated until a registration error given by the RMS error between the registered images has been reduced to an acceptable, typically predetermined level. Gradient-based methods fail where the initial registration error is too large, thus to allow operation in this case, a rigid RST (rotation, scale, translation) transform can be estimated to provide an initial candidate motion field, and the non-rigid alignment can be operated from a low resolution to a high resolution in a pyramidal scheme.

The distortion map may have associated statistics. For example, one statistic is the RMS (root mean squared) error between the pixels of a pair of the captured image of sample A and the captured image of sample B warped according to the distortion map. The RMS error can be used as a confidence metric. The distortion map and associated information, such as confidence metric, are temporarily stored in the memory 1806 for retrieval and combination at a subsequent step 1470. At step 1460 the processor 1805 determines whether all captured images for samples A and B that are intended for use in the registration have been received and processed. The set of images to be used by the registration algorithm may include a set of those with the smallest transverse wavevector as will be described below. If not, execution resumes at step 1410. If all images have been received, the distortion maps generated at step 1450 are combined at step 1470 to generate a single distortion map, termed the combined distortion map.

Figure 25:
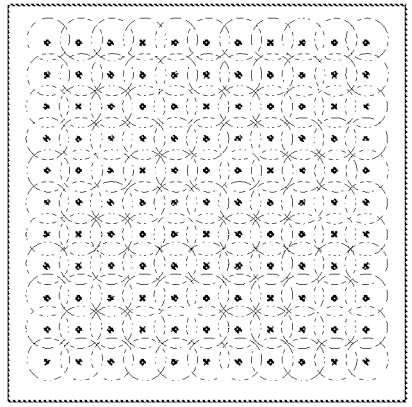
FIGS. 25(1) to 25(6) illustrate selected regions of a Fourier space representation of a specimen.
Figure 25:
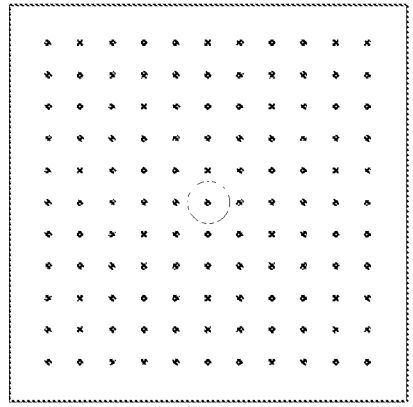
Figure 25:
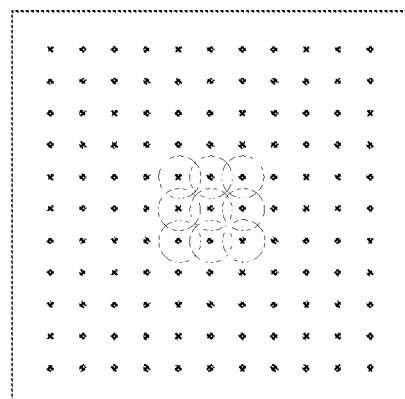
Figure 25:
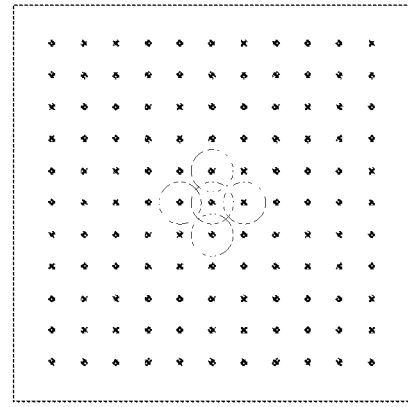
Figure 25:
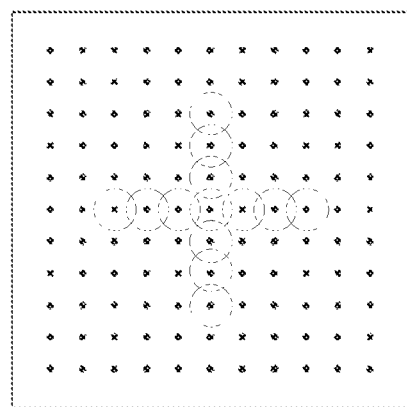
Figure 25:
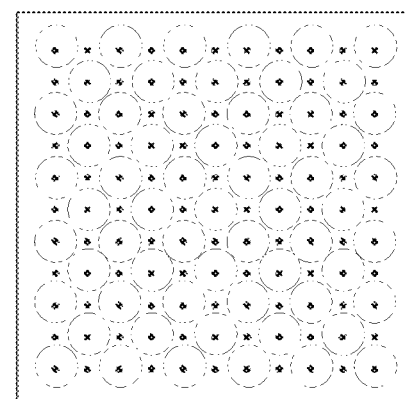

Preferably, all captured FPM image pairs are used to generate corresponding distortion maps as indicated in FIG. 25(1). However a subset of the captured FPM image pairs may be used to generate corresponding distortion maps. For example, image pairs associated with low spatial frequencies or image pairs which do not have overlapping frequency support. If a subset of the calculated distortion maps is used for combination, the distortion map calculation at step 1440 is only required for image pairs within the desired subset. The subset may be predetermined based on locations in Fourier space as controlled by the optical configuration. An example subset is the DC (central) Fourier location as shown in FIG. 25(2). Alternative subsets include DC and the nearby Fourier regions seen in FIG. 25(3) and FIG. 25(4), DC and axial seen in FIG. 25(5), or diagonal regions within a square or circle of variable size, centered on DC. Non-overlapping subsets may be used as indicated in FIG. 25(6). Other subsets may be used.

Preferably, the distortion maps are combined by simple averaging. Alternatively, a weighted combination scheme may be used. For example, the weight may be determined by the radial transverse wavevector associated with the captured image pair used for distortion map generation. Other combination schemes may be used including non-linear methods, or a weighting scheme based on a confidence measure associated with each distortion map.

In other implementations of the processing of method 1400, sets of images from each sample may be combined prior to analysis. For example they may be simply averaged or processed together to form a higher resolution image of the specimen. Such combined images may be received as captured images at step 1410, however in this case the optical configuration information defining the images must include information on all of the images that were combined and the method of combination.

Second Arrangement

As the combined spectrum images may be relatively large (greater than 25,000 by 25,000 pixels), it is often desirable to view just a sub-region. Now described is an alternative arrangement in which one or more regions of interest may be selected by a user or determined automatically by an image analysis algorithm. Registered combined spectrum images of these regions are generated for both sample A and sample B. The processing required to generate the combined spectrum image from the captured FPM images is significantly reduced due to the reduced pixel count.

Figure 15A:
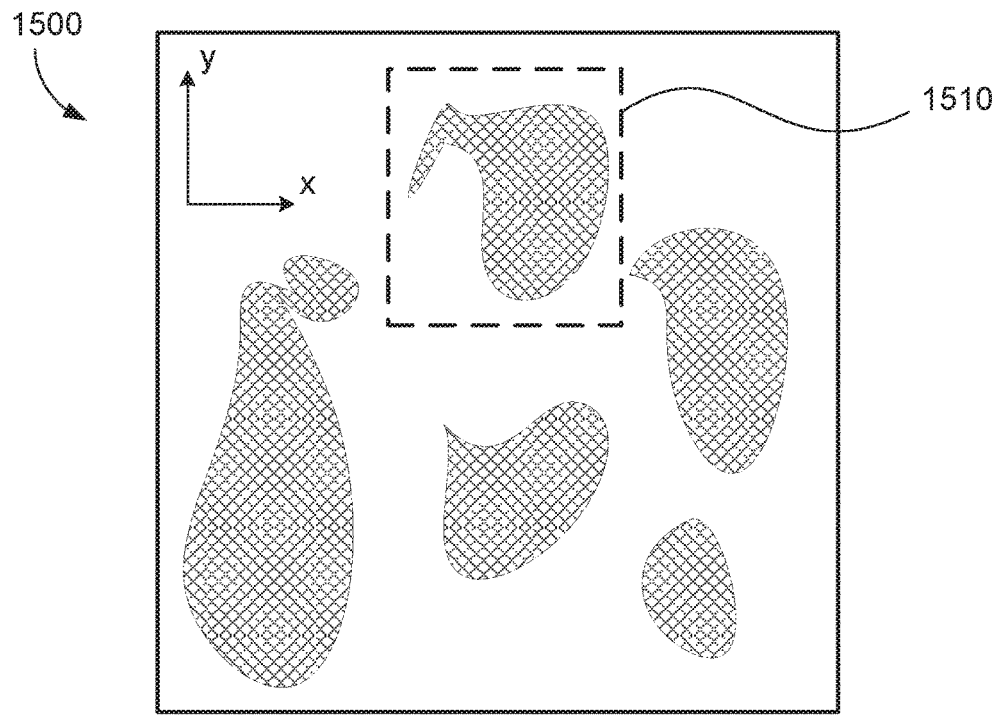
FIGS. 15A and 15B illustrate respectively sample A and sample B including a region of interest.
Figure 15B:
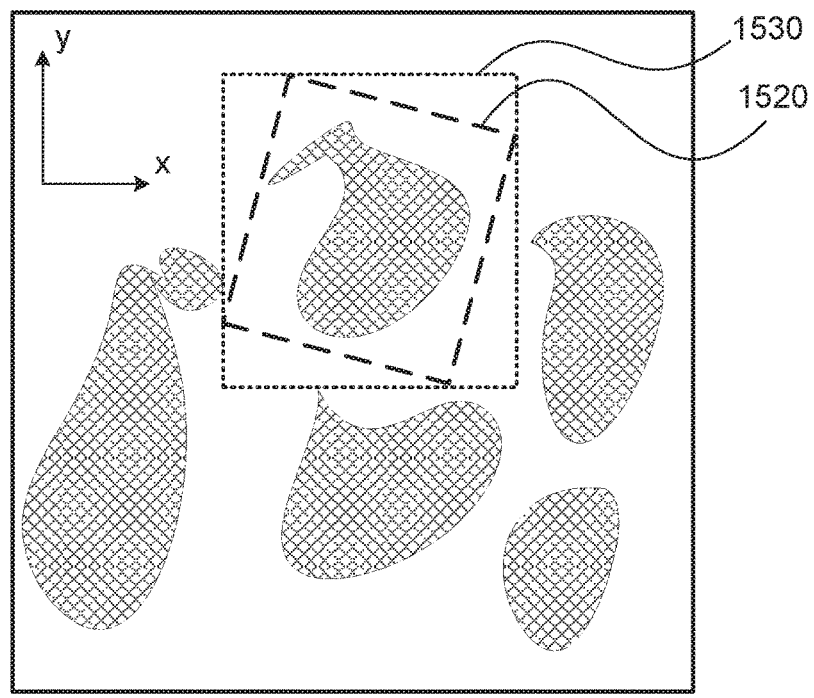
Figure 16:
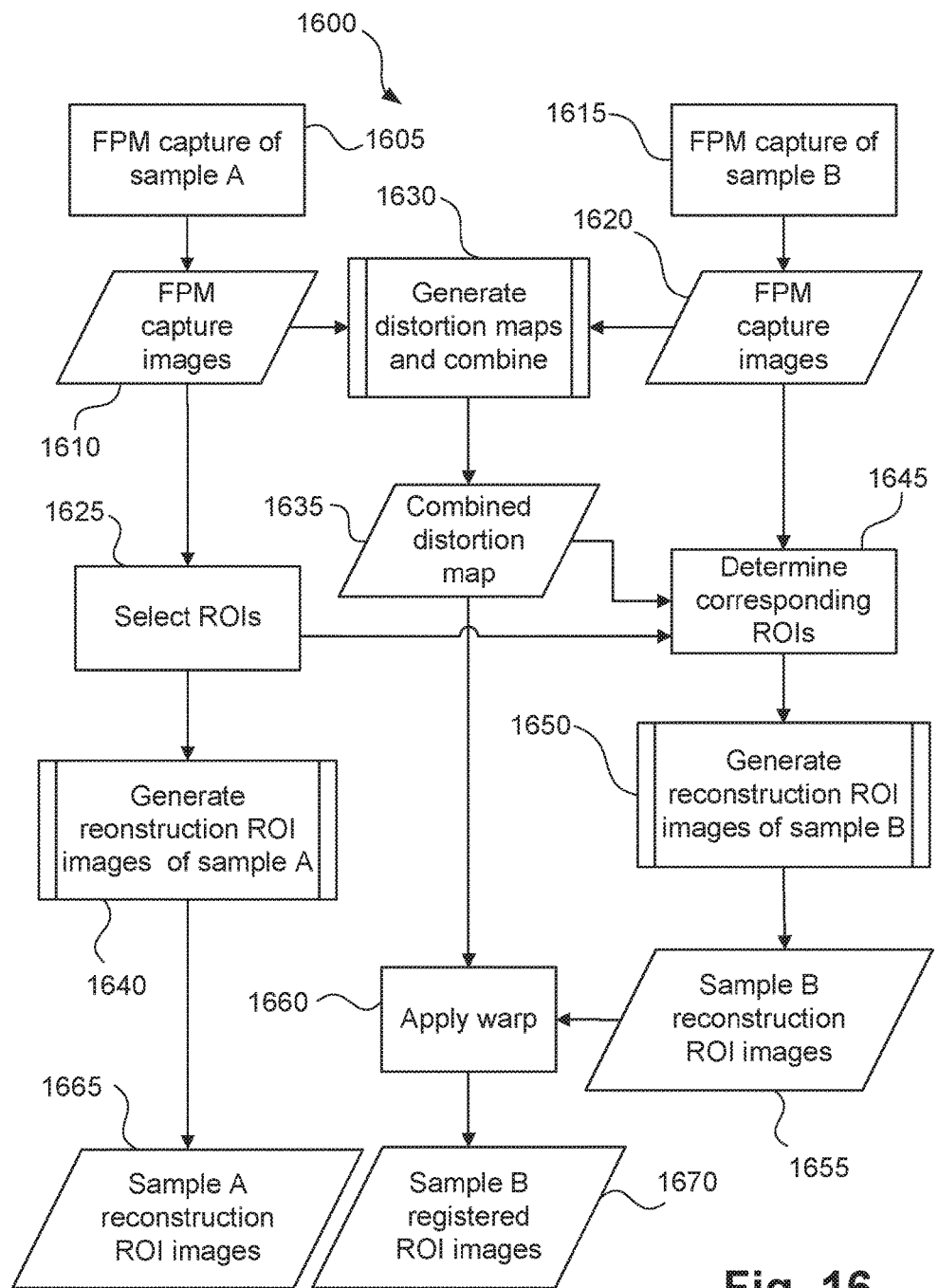
FIG. 16 is a schematic flow diagram of a method of generating one or more registered regions of interest of two specimens.

FIG. 15A is an illustration of an exemplary sample A and FIG. 15B is a similar illustration of a corresponding sample B. A region of interest (ROI) in sample A is indicated by a dashed rectangle 1510. The corresponding region in sample B is indicated by the dashed region 1520. Note that, although the corresponding region 1520 is shown in this schematic example as a rectangle, generally the region 1520 will have a curved boundary. However, since region selection is typically performed in the coordinates of the original slide image, at portion 1530 of the image of FIG. 15B is selected which contains the corresponding region 1520 of sample B and which is aligned with the region 1510 of sample A. The region 1520 may be determined by application of the corresponding distortion map to the region 1510. As illustrated, the portion 1530 may be obtained via the position of a bounding box of the region 1520, and thus corresponds in subject matter to the region 1510. FIG. 16 is a schematic block diagram showing a modified version of the data processing architecture of FIG. 9. Operations for selecting regions of interest 1625 of sample A and determining the corresponding regions 1645 of sample B have been introduced.

Figure 17:
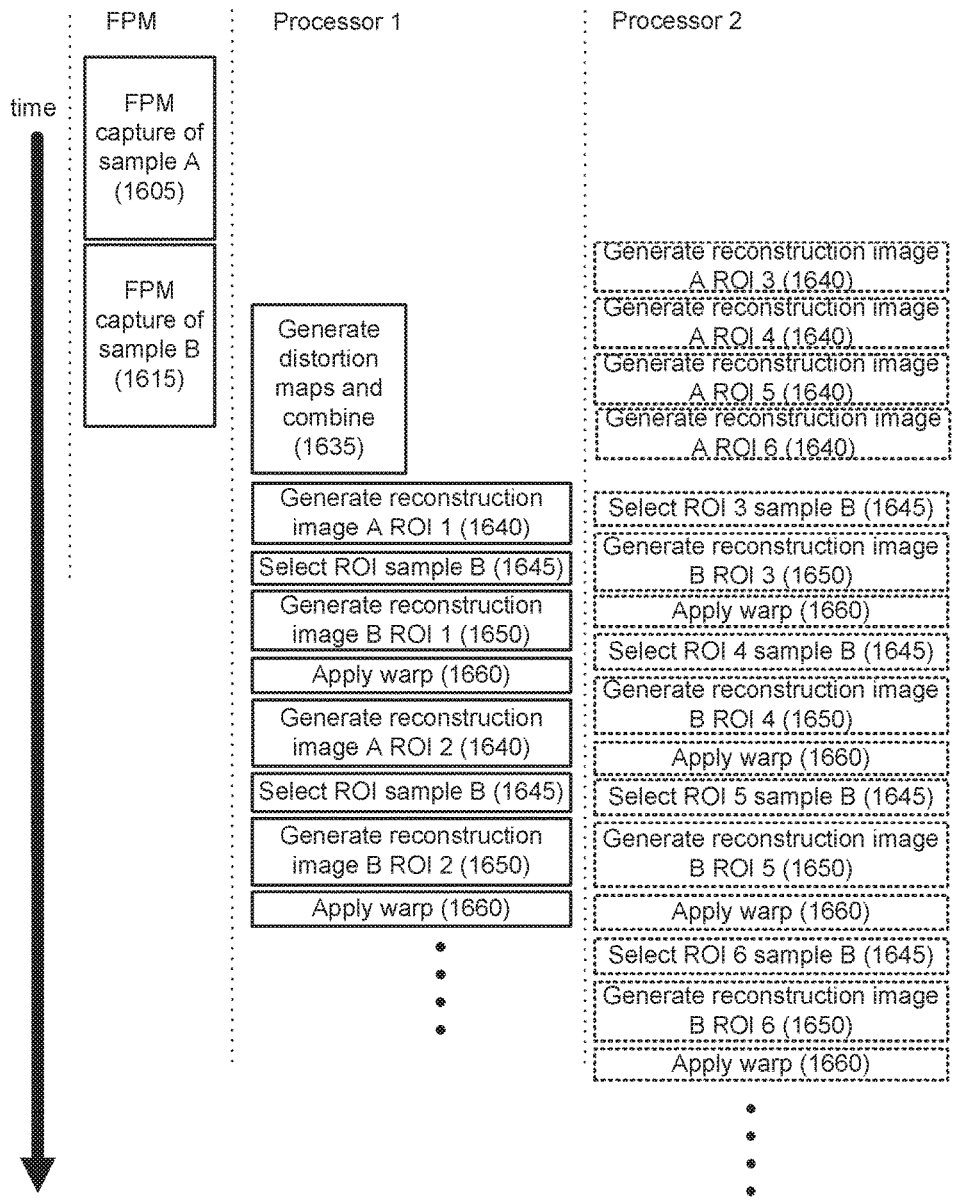
FIG. 17 illustrates exemplary processing flows for the method of FIG. 16.
Figure 19:
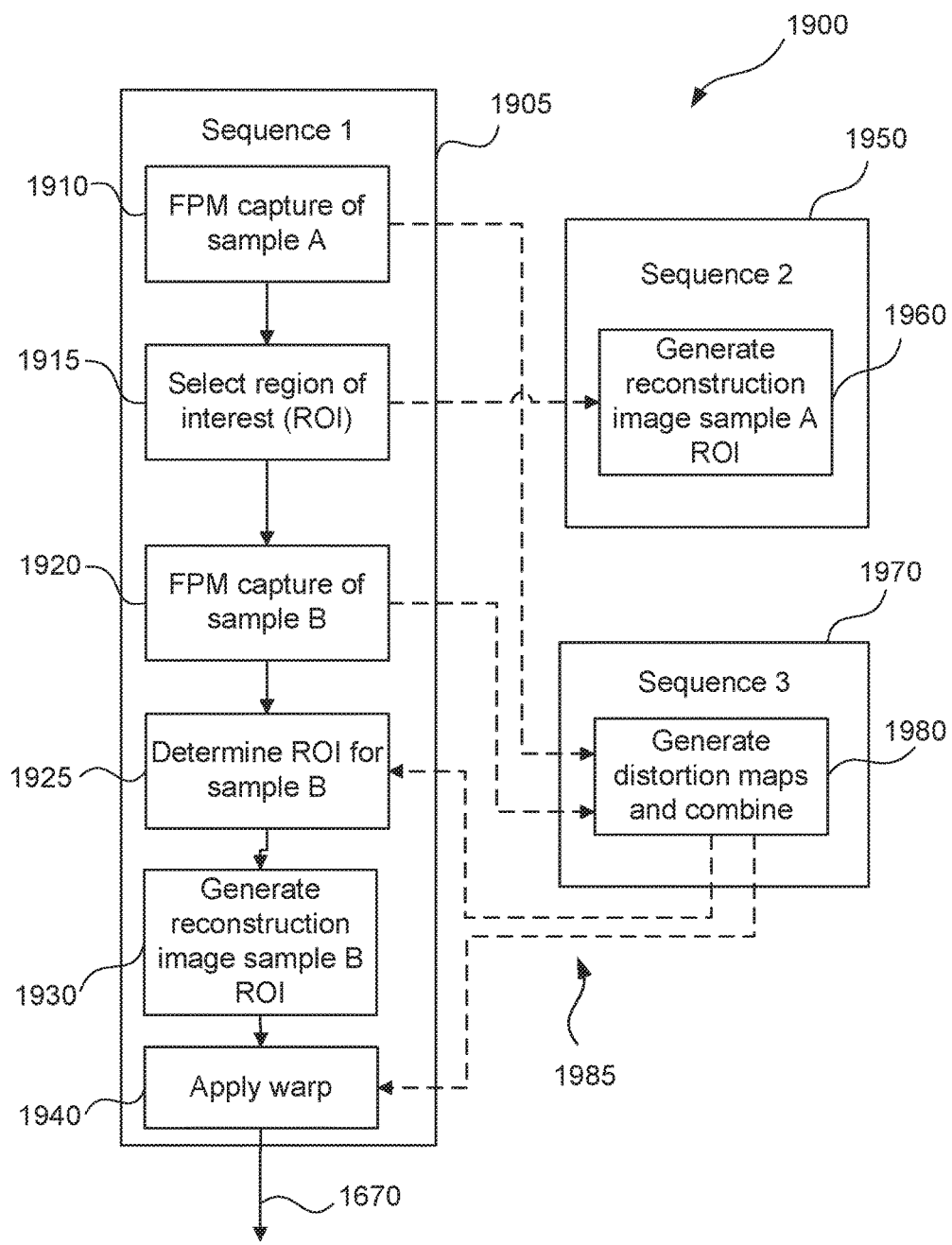
FIG. 19 is a schematic flow diagram of a method of registering a region of interest of two combined spectrum images which includes parallel execution.

A number of processes in method 1600 may be performed in parallel in order to achieve faster throughput. One option is illustrated in FIG. 17 for multiple regions of interest. An option for a single region of interest is shown in FIG. 19. As a result of processing only selected ROIs, the total processing time may be greatly reduced.

FIG. 17 illustrates the processing timing and synchronisation for a system in which there is a single FPM device and one or more processors that may be used to perform the various processing steps of a method 1600, seen in FIG. 16. The vertical axis of FIG. 17 represents time, such that the height of each processing step corresponds to the relative processing time. The exact processing time of each step will depend on many configuration parameters of the FPM including the number and optical configurations associated with the images, and also on various parameters used in the FPM reconstruction and distortion map generation steps.

With reference to both FIGS. 16 and 17, the FPM captures images of sample A 1610 first at step 1605, and then of sample B 1620 in step 1615. The generation of the combined distortion map at step 1635 can be performed on processor 1 once a relatively small subset of the FPM images of both samples have been captured. Following this, the processor 1805 can proceed to generating registered regions of interest of sample A 1665 and sample B 1670 according to the processing steps 1625, 1640, 1645, and 1650. The regions of interest selected in step 1625 may have been selected by a user (via a GUI representation), or by an algorithm, for example as part of a Computer Aided Diagnosis (CAD) system. Based on the ROI selected in step 1625, and the combined distortion map 1635, step 1645 can then determine the corresponding ROI for sample B. Reconstruction of the ROI images can then follow in steps 1640 and 1650 respectively. These processing steps may be spread over multiple processors if they are available. For example, if there are enough processors, generation of a combined spectrum image for a region of interest of sample B (step 1650) can be performed on a processor different from the processor generating a combined spectrum image for a region of interest of sample A (step 1640), so that two regions of interest are reconstructed in parallel. Additionally, the order of these steps for various ROIs may be modified. For example, as illustrated in FIG. 17, the second processor can generate reconstructed images for ROIs 3 to 6 prior to the generation of the distortion map 1635. Then steps 1645, 1650 and the application of the warp at step 1660, may be performed for each of the ROIs 3 to 6 in turn, to perform the desired registration.

Many variants of the processing flow appropriate to this arrangement may be used, such as alternative numbers of processors or arrangements of processing steps among the processors.

FIG. 19 shows a modification to the sequence of operations shown in FIG. 12 whereby execution is performed in three parallel sequences. This arrangement allows for the generation of the combined spectrum image of a single region of interest for sample A and the corresponding region of interest of sample B to be performed in parallel in addition to the parallel generation of the distortion map as described with references to FIG. 17. Alternative arrangements based on FIG. 11 and FIG. 13 may be employed.

A first execution sequence 1905 comprises steps 1910, 1915, 1920, 1925, 1930, and 1940. A second execution sequence 1950 comprises the step 1960. A third execution sequence 1970 comprises the step 1980.

At step 1910 of the first execution sequence 1905, partial spectrum captured FPM images 1610 of sample A are captured using the FPM as described in the method 200. The captured FPM images 1610 are passed to the third execution sequence 1970, operating in parallel with the first execution sequence. At step 1915 of the first execution sequence, the captured image of sample A corresponding to on-axis illumination is used to identify a region of interest. The region of interest may be selected manually or automated by an image analysis process and may be defined as a boundary or a mask. Sub-images are formed from the captured FPM images which contain the region of interest. For example, they may be rectangular regions with a bounding box that covers the entire region. The rectangular region may extend further than the ROI by some buffer region with a size that may be defined by a fixed number of pixels, or a percentage of the bounding box around the ROI, or by some combination of buffer region sizes determined in this way (e.g. the maximum of two parameters determined based on a fixed size and a percentage of the bounding box). The sub-images are passed to the second execution sequence 1950. At step 1960 of the second execution sequence 1950, a reconstructed sub-image of sample A is generated as described in the method 300 using the sub-images. At step 1920 of the first execution sequence 1905, FPM images 1620 of sample B are captured using the FPM as described in the method 200. The captured FPM images 1620 are passed to the third execution sequence 1970. The step 1980 of the third execution sequence 1970 generates a combined distortion map 1985 which is sent to steps 1925 and 1940 of the first execution sequence. At step 1925 of the first execution sequence, the combined distortion map is applied to the boundary or the mask defining the region of interest selected for sample A to obtain a corresponding region of interest for sample B. This region of interest may not be rectangular, and it may be appropriate to extend or expand the region of interest to an enclosing rectangular region better suited for a reconstruction process. Sub-images are formed from the captured FPM images of sample B which contain the region of interest determined for sample B. Execution continues at step 1930, where a reconstructed sub-image of sample B is generated as described in the method 300 using the corresponding sub-images. In a preferred implementation, the reconstruction of step 1930 is performed using the corresponding sub-images to the exclusion of those sub-images that are not associated with the region of interest (i.e. non-selected portions of the slide images). At step 1940 the distortion map received from step 1980 is used to generate a reconstructed sub-image of sample B 1670 registered to the corresponding sub-image of sample A.

Third Arrangement

The distortion map may also be used to improve the speed and accuracy of the process of generating the combined spectrum image of sample A. The initial combined spectrum image for sample A (from step 1210) is initialised with the combined spectrum image obtained for sample B which has been warped according to the combined distortion map. It should be noted that in order to take advantage of this arrangement sample A and sample B need to be substantially similar, e.g. they may be sequential slides of the same specimen stained in the same manner. For example, whether two slides are adjacent in a sequence can be checked by analysing labels, such as barcodes, attached to the slides.

Figure 20:
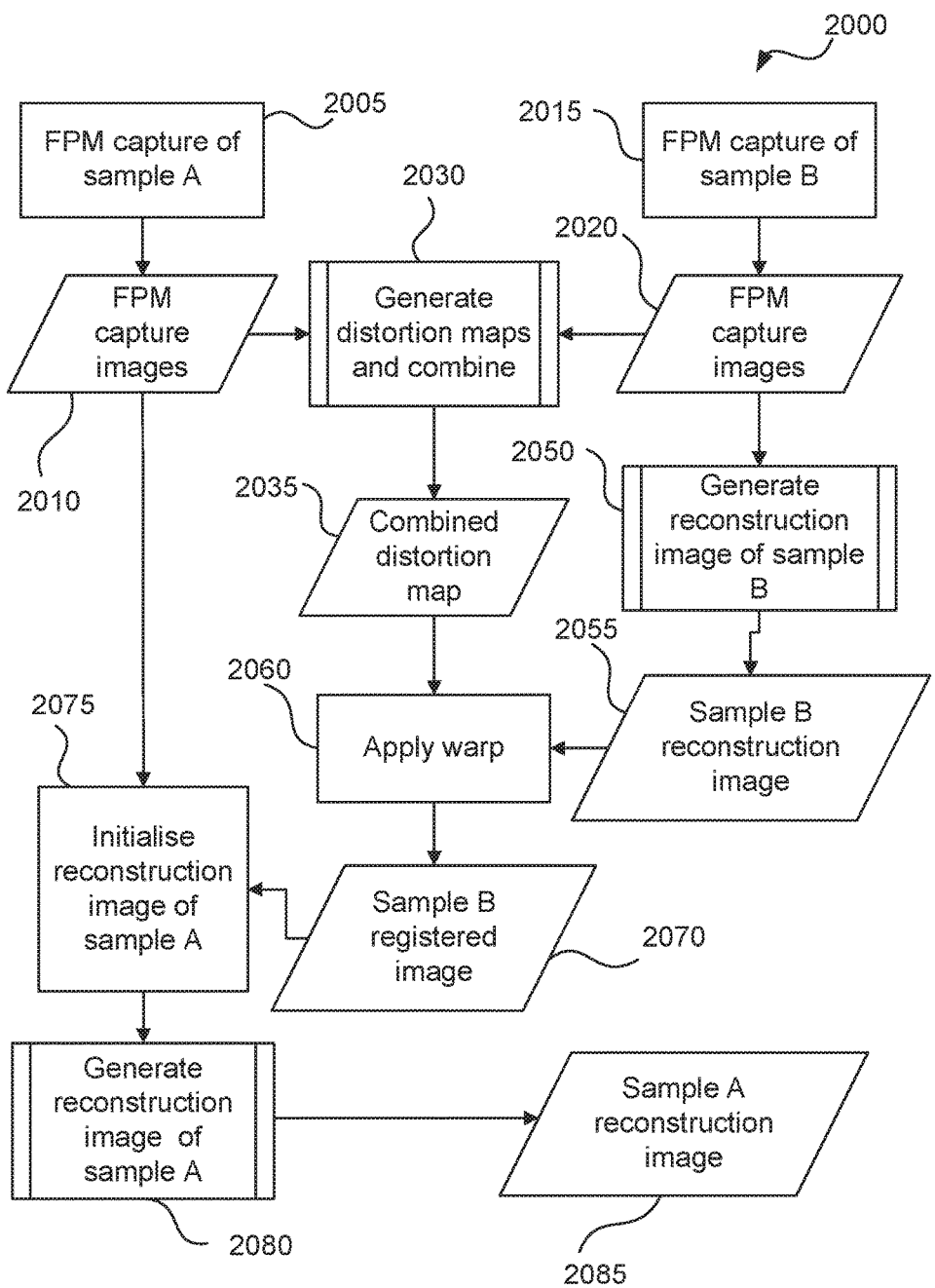
FIG. 20 is a schematic block diagram of a data processing architecture according to a further implementation.

FIG. 20 is a schematic block diagram of an architecture 2000 representing a modified version of the data processing architecture 900 of FIG. 9. As with the previous arrangements, the process 2000 commences with capture of sample A 2010 at step 2005 and capture of sample B 2020 at step 2015. Step 2030 generates distortion maps and combines the generated distortion maps to form a combined distortion map 2035. A suitable method 1400 for performing step 2030 was described in further detail with respect to FIG. 14. As with previous arrangements, the sample B images 2020 are input to a reconstruction step 2050 to provide a combined spectrum reconstructed image 2055 of sample B. The map 2035 is then used to apply warp to the combined spectrum image 2055 in step 2060 to output a registered sample B image 2070. In this specific arrangement, the registered sample B image 2070 is the used as a warp image with the capture sample A 2010 image at step 2075 to initialise or estimate reconstruction of the sample A image. This involves performing steps akin to step 510 discussed above. Once initialised step 2080 follows as before to generate a reconstruction of the sample A image 2085. In comparison to the arrangement of FIG. 9, the additional initializing step 2075 achieves an accelerated reconstruction by using the registered sample B as an initial start point that aids convergence of the reconstruction process for sample A.

Figure 21:
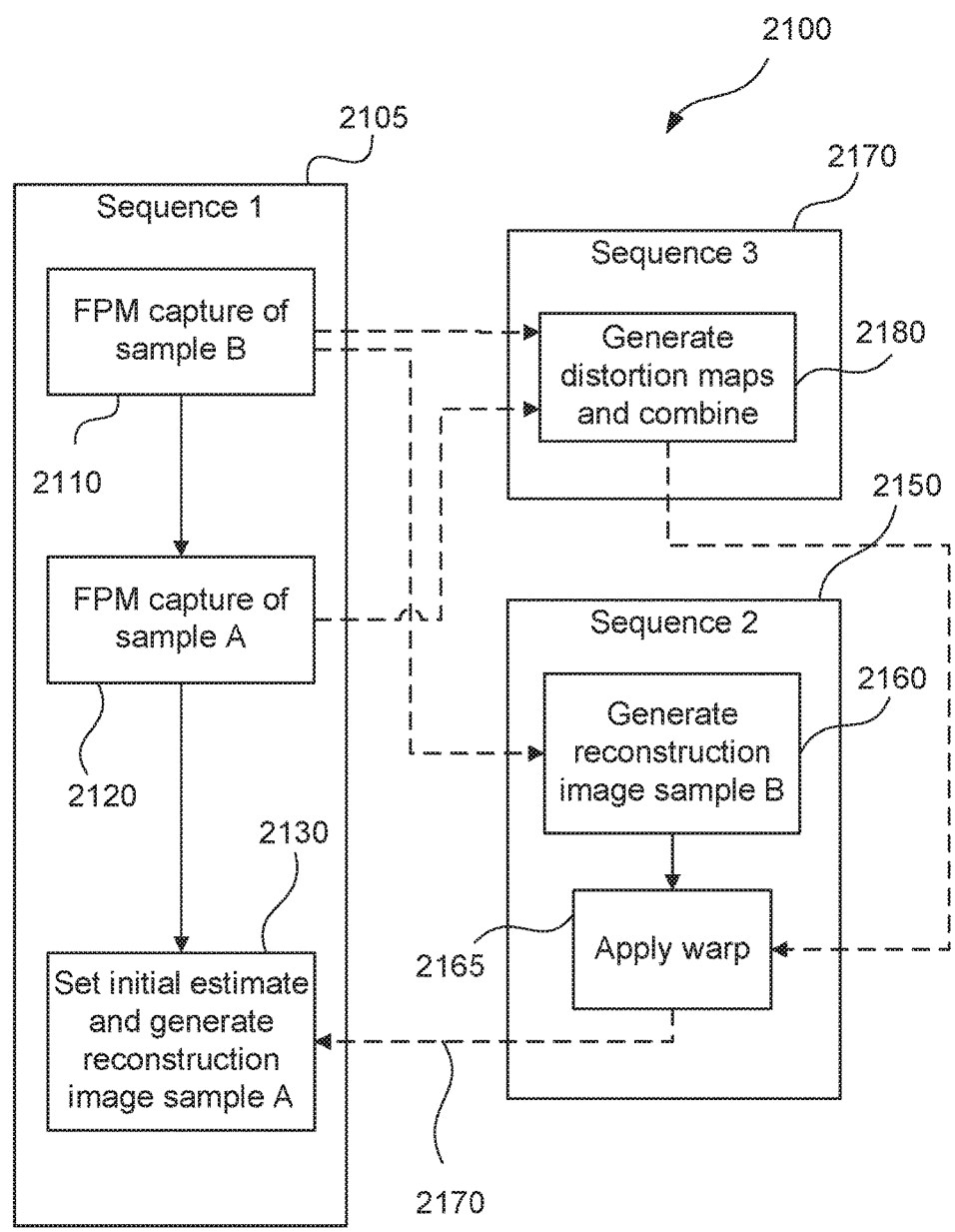
FIG. 21 is a schematic flow diagram of a method of registering two combined spectrum images with improved generation of a combined spectrum image which includes parallel execution.

FIG. 21 shows a method 2100 representing a modification to the sequence of operations shown in FIG. 12, whereby execution of FIG. 20 can be performed in three parallel sequences. This arrangement allows for the generation of the combined spectrum image for sample A, the generation of the combined spectrum image for sample B and the generation of the distortion map to be performed in parallel. Alternative arrangements based on FIG. 11 and FIG. 13 may be employed.

In the method 2100, sample A is captured after sample B and sample B is registered to sample A using the standard application of the distortion map.

A first execution sequence 2105, comprises steps 2110, 2120, and 2130. A second execution sequence 2150 comprises the steps 2160 and 2165. A third execution sequence 2170 comprises the step 2180.

At step 2110 of the first execution sequence 2105, FPM images 2020 of sample B are captured using the FPM as described in the method 200. The captured FPM images 2020 are passed to the second execution sequence 2150, and the third execution sequence 2170, operating in parallel with the first execution sequence 2105. At step 2120 of the first execution sequence 2105, FPM images 2010 of sample A are captured using the FPM as described in the method 200. The captured images 2010 are passed to the third execution sequence 2170.

The step 2180 of the third execution sequence 2170 generates a combined distortion map which is sent to step 2165 of the second execution sequence 2150.

At step 2160 of the second execution sequence, a combined spectrum image of sample B 2055 is generated as described in the method 300 using the captured FPM images 910. At step 2165 the distortion map received from step 2180 is used to generate a combined spectrum image 2170 of sample B registered to sample A. The image 2170, which is a warped image, is sent to step 2130 of the first execution sequence.

At step 2130 of the first execution sequence, the registered combined spectrum image of sample B 2070 is used to initialise reconstruction for sample A as described in step 510 which forms part of process 300 that generates a combined spectrum image of sample A 2085.

Optionally, a partially combined spectrum image of sample B may be used at step 2130. This allows the generation of the combined spectrum image for sample A to commence sooner, so that reconstruction of slides A and B is happening concurrently. Partial reconstruction is described below in respect of a fifth arrangement.

Fourth Arrangement

The distortion map may also be used to warp the captured images of sample B prior to the reconstruction. In this case the result of reconstruction will be an image of sample B registered to sample A. In this way, the step of warping the large combined spectrum image of sample B is avoided.

Figure 22:
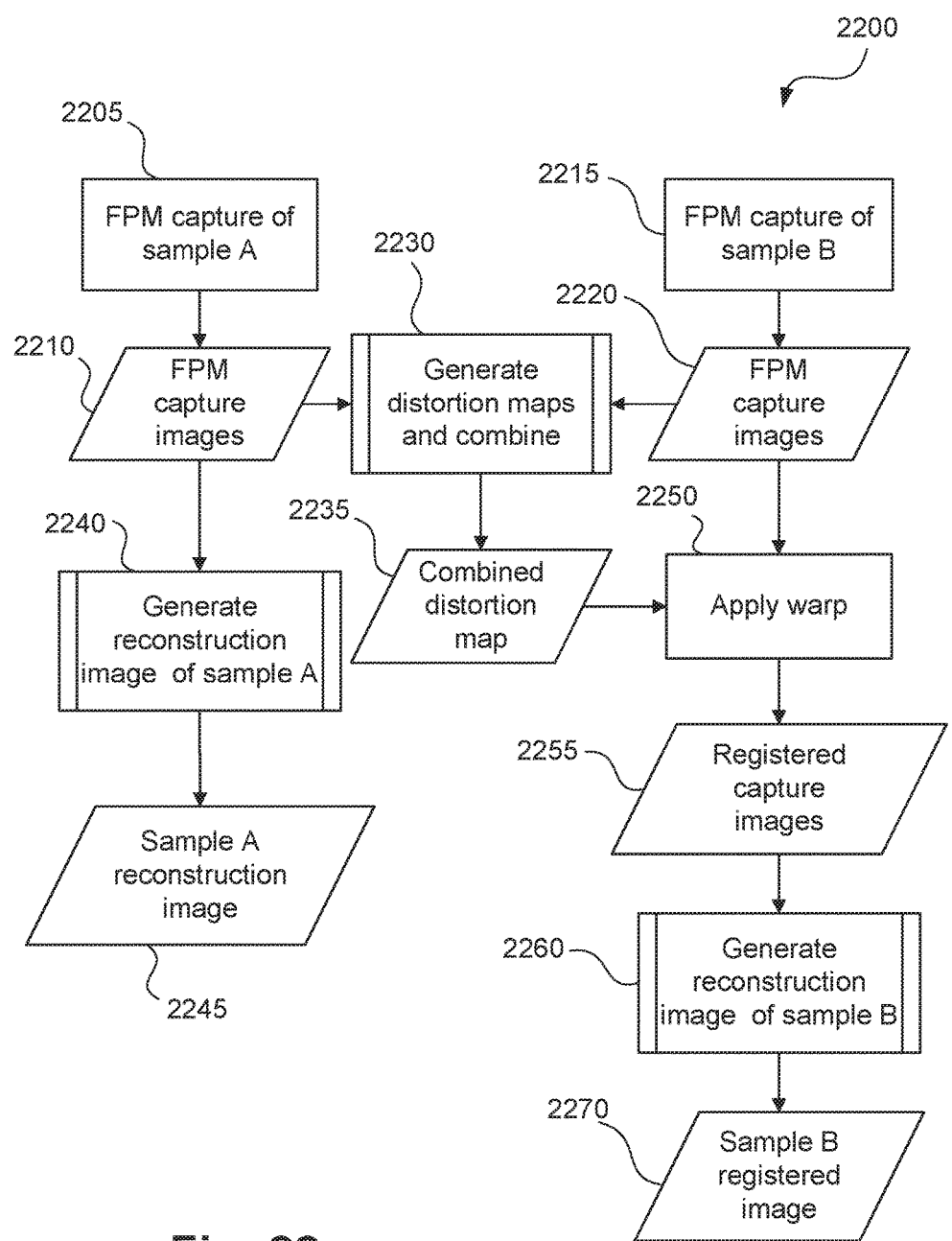
FIG. 22 is a schematic block diagram of a data processing architecture according to a further implementation

FIG. 22 is a schematic block diagram showing an alternative data processing architecture 2200. An FPM is used to capture at step 2205 multiple images 2210 with different optical configurations of a first specimen (sample A) mounted on slide. Similarly, multiple images 2220 are captured at step 2215 of a second specimen (sample B) mounted on another slide using an FPM. Pairs of partial spectrum images of sample A and sample B which correspond to the same optical configuration are used as inputs into a geometric distortion estimation and combination process 2230 to obtain an estimate in the form of a combined distortion map 2235. The FPM sample A images 2210 are input to a phase recovery process 2240 to obtain a combined spectrum image 2245 of sample A. The combined distortion map 2235 is applied by a warp process 2250 to the captured FPM images 2220 to obtain registered partial spectrum images 2255 of sample B. The registered captured FPM images 2255 of sample B are input to a phase recovery process 2260 to generate a combined spectrum image 2270 of sample B, which is registered with sample A.

A number of processes in method 2200 may be performed in parallel in order to achieve faster throughput. One option is illustrated in FIG. 23.

Figure 23:
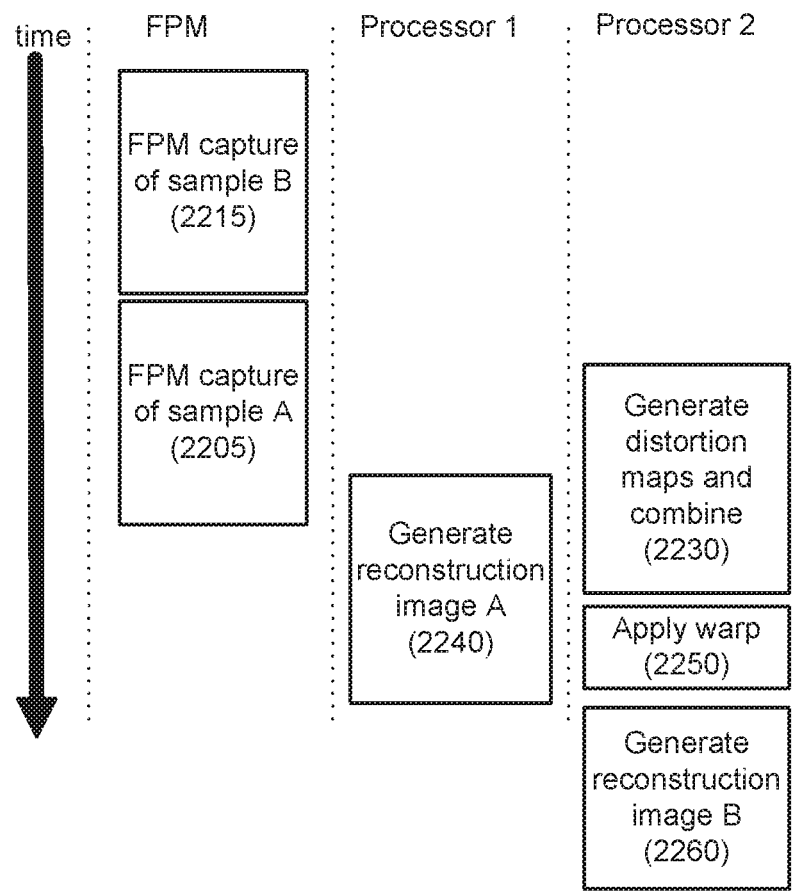
FIG. 23 is an exemplary processing flow of the arrangement of FIG. 22.

FIG. 23 illustrates the processing timing and synchronisation for a system in which there is a single FPM device and one or more processors that may be used to perform the various processing steps of method 2200. Again, the vertical axis represents relative time, and the exact processing time of each step will depend on many configuration parameters of the FPM and of the reconstruction and distortion map generation steps.

The FPM captures images of sample B first at step 2215 and then of sample A at step 2205. The phase recovery of step 2240 for sample A may be performed on processor 1 once sufficient FPM images of sample A have been captured. The generation of distortion maps of step 2230 can be performed on processor 2 once a relatively small subset of the FPM images are captured for both samples. Following this, the processor can proceed to apply the warp map to the captured partial spectrum images in step 2250 and then generate at step 2260 a combined spectrum image of sample B where phase information is recovered. This combined spectrum image is aligned to sample A as a result of the prior application of the distortion map to the captured images. It is noted in FIG. 23 that the order of capture of images of samples A and B (2205 and 2215) may be interchanged.

The arrangements of parallel operation shown in FIG. 11, FIG. 12 and FIG. 13 may be modified according to FIG. 22.

Fifth Arrangement

A pair of partially reconstructed images can be generated using a selected subset of the captured FPM images of samples A and B. A distortion map is obtained from the partially combined spectrum image pair. The partially reconstructed images contain phase information which may be incorporated in the distortion estimation process. In some regions where the magnitude image has limited texture, the use of phase information might be used to improve the overall accuracy of registration. For example, image registration may be performed based on the phase images, the phase gradient, or some suitably filtered phase image.

Figure 24:
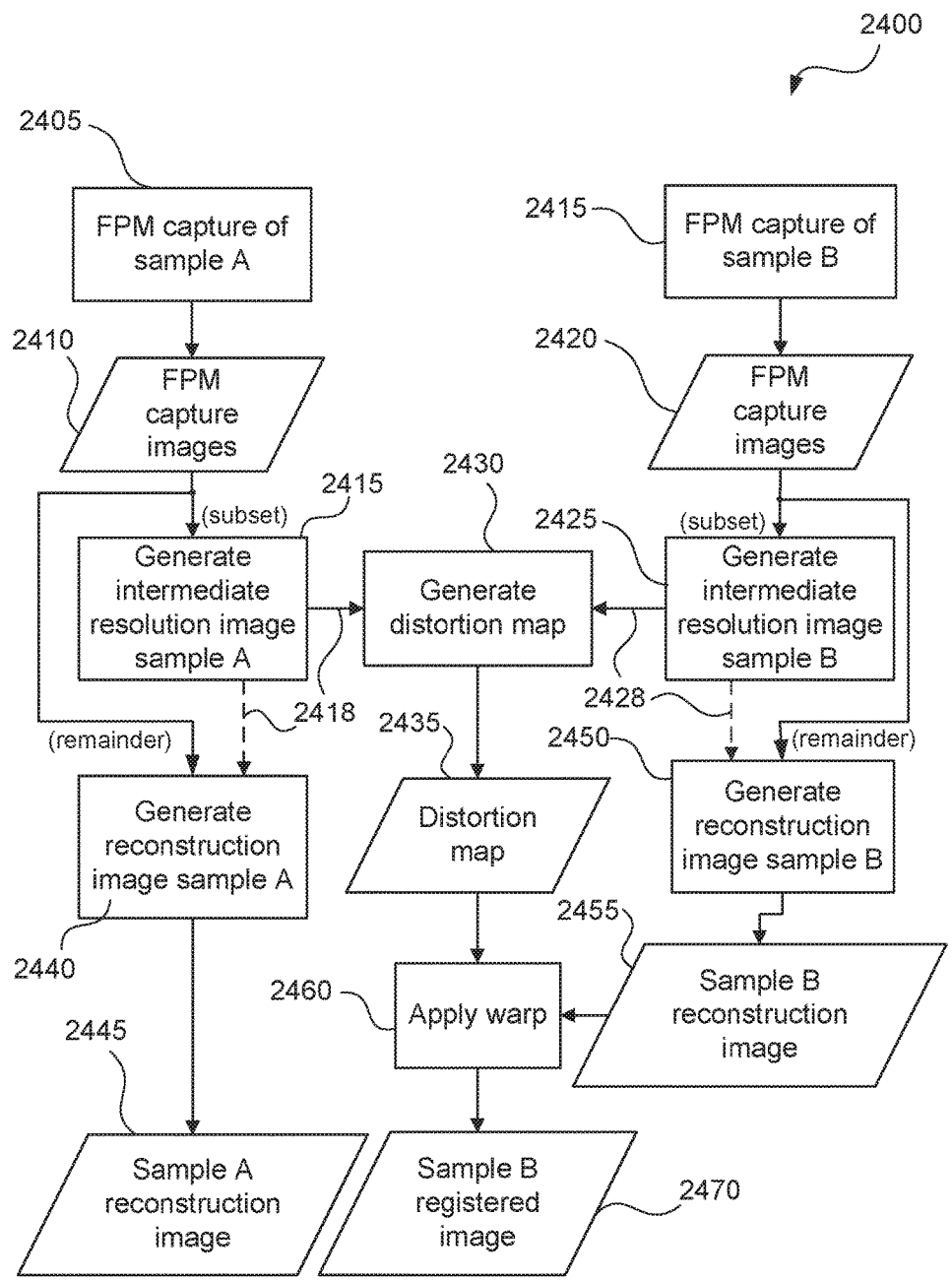
FIG. 24 is a schematic block diagram of a data processing architecture according to a further implementation.

FIG. 24 is a schematic block diagram showing an alternative data processing architecture 2400 using partial reconstruction. An FPM is used to capture at step 2405 multiple images 2410 with different illumination conditions of a first specimen (sample A) mounted on slide. Similarly multiple images 2420 are captured at step 2415 of a second specimen (sample B) mounted on another slide using an FPM. A subset of FPM images derived from the FPM images 2410 for sample A are then input to a phase recovery process 2415 to obtain an intermediate resolution combined spectrum image 2418 of sample A. The preferred subset is the set of images with transverse wavevectors closest to zero (the DC transverse wavevector). For example, in an angled illumination FPM these might be the on-axis image and the images adjacent to this in transverse wavevector space with small angles relative to the optical axis. A subset of FPM images derived from the FPM images 2420 for sample B are input to a phase recovery process 2425 to obtain an intermediate resolution combined spectrum image 2428 of sample B. The preferred subset is the images with corresponding illumination conditions as used for the subset of sample A. The intermediate resolution reconstructed images of samples A and B are used as inputs to a geometric distortion estimation process which forms the map 2430 to obtain a distortion estimate map 2435.

The remaining FPM images 2410 of sample A which were not in the subset are input to a phase recovery process 2440 to obtain a combined spectrum image 2445 of sample A. This process may use the intermediate resolution image 2418 from step 2415 as a suitable initialisation for the reconstruction. Similarly, the remaining FPM images 2420 of sample B which were not in the subset are input to a phase recovery process 2450 to obtain a combined spectrum image 2455 of sample B, and this process may use the intermediate resolution image 2428 from step 2425 as a suitable initialisation for the reconstruction. The distortion estimate map 2435 is applied by process 2460 to the combined spectrum image 2455 to obtain an image 2470 of sample B which is registered with the image 2445 of sample A.

The arrangements of parallel operation shown in FIG. 11, FIG. 12 and FIG. 13 may be modified according to FIG. 24.

Further, the method 2400 of generating the distortion map may be incorporated into the other arrangements.

INDUSTRIAL APPLICABILITY

The arrangements described are applicable to the computer and data processing industries and particularly for the registration of microscopic images of biological samples.

The foregoing describes only some embodiments of the present invention, and modifications and/or changes can be made thereto without departing from the scope and spirit of the invention, the embodiments being illustrative and not restrictive.

We claim:

1. A computer-implementable method for processing images captured using a microscopy device, the method comprising:

for each of a first microscopy slide and a second microscopy slide, capturing a plurality of partial spectrum images under multiple optical configurations so that each partial spectrum image captures a different portion of the spectrum of substantially same area of at least one of the first microscopy slide and the second microscopy slide;

selecting, from a first plurality of partial spectrum images, a partial spectrum image associated with a first optical configuration, wherein the first plurality of partial spectrum images is used in a reconstruction of a first combined spectrum image of at least part of the first microscopy slide;

determining a partial spectrum image in a second plurality of partial spectrum images captured under substantially the same optical configuration as the selected partial spectrum image to establish a first pair of partial spectrum images, wherein the second plurality of partial spectrum images is used in a reconstruction of a second combined spectrum image of at least part of the second microscopy slide;

determining a distortion map by aligning images derived from the first pair of the corresponding partial spectrum images, wherein the determined distortion map is used to process at least one of the first and second combined spectrum images.

2. A method according to claim 1, further comprising selecting, from a first plurality of partial spectrum images, a partial spectrum image associated with a second optical configuration;

determining a partial spectrum image in a second plurality of partial spectrum images captured under the second optical configuration to establish a second pair of partial spectrum images;

generating a first distortion map by aligning the first pair of spectrum images;

generating a second distortion map by aligning the second pair of spectrum images; and combining the first distortion map and the second distortion map to determine the distortion map for aligning the combined spectrum images.

3. A method according to claim 1 wherein the combined spectrum image of the first slide corresponds to a region of interest that covers a part of the first slide and the combined spectrum image of the second slide covers a corresponding region.

4. A method according to claim 1, further comprising:

selecting a region of interest within the first microscopy slide;

determining a corresponding region in the second microscopy slide using a position of the selected region of interest within the first microscopy slide and the determined distortion map;

selecting at least one portion in each image of the second plurality of partial spectrum images based on the determined region; and reconstructing the corresponding region of the second microscopy slide using the selected portions.

5. A method according to claim 1, further comprising applying the distortion map to the combined spectrum images of the first microscopy slide to form a warped image; and using the warped image as an estimate in the process of reconstructing the second microscopy slide.

6. A method according to claim 4, wherein the reconstructing is done to the exclusion of non-selected portions of images of the first and second microscopy slides.

7. A method according to claim 2, wherein the first optical configuration and the second optical configuration correspond to low transverse wavevectors in Fourier space near to DC.

8. A method according to claim 1, wherein the first optical configuration corresponds to optical configurations for DC transverse wavevectors only.

9. A method according to claim 7, wherein the first optical configuration and the second optical configuration correspond to optical configurations for a DC transverse wavevector and a set of wavevectors adjacent to the DC transverse wavevector respectively.

10. A method according to claim 1, wherein the microscopy device is a Fourier Ptychographic Microscopy device.

11. A method according to claim 1, wherein the reconstruction recovers phase information of one of the first and second microscopy slides.

12. A method according to claim 11, wherein the process of recovering phase information for at least one of the microscopy slides is performed in parallel with determining the distortion map.

13. A method according to claim 1, wherein the optical configurations are obtained by varying illumination settings.

14. A method according to claim 1, wherein the optical configuration used to capture an image is encoded as a wavevector.

15. A method according to claim 1, wherein registering comprises applying the determined distortion map to the second combined spectrum image to align the second combined spectrum image with the first combined spectrum image.

16. A method according to claim 1, further comprising displaying the distortion map as a supplement to displayed first and second combined spectrum images.

17. A method according to claim 1, further comprising using the distortion map to highlight areas of high distortion in at least one of the first and second combined spectrum images.

18. A method according to claim 1, wherein the distortion map is determined based on the at least one pair of the corresponding partial spectrum images concurrently with reconstructing at least one of the first microscopy slide and the second microscopy slide.

19. A method according to claim 1, wherein the determining of the distortion map comprises:
selecting a subset of the first plurality of partial spectrum images and a corresponding subset of the second plurality of partial spectrum images based on illumination settings used to capture the partial spectrum images;
partially reconstructing the first microscopy slide and the second microscopy slide using the respective selected subsets to recover phase information of the corresponding slide; and
determining the distortion map for the partially reconstructed images using the recovered phase information.

20. A method according to claim 1, wherein:
the captured plurality of partial spectrum images represent different frequency bands of substantially same area of the microscopy slide;
the selecting comprises selecting, from a first plurality of the images used to form a combined spectrum image of the first microscopy slide, a first image capturing a first frequency band of the first microscopy slide;
the determining comprises identifying, in a second plurality of the images used to form a combined spectrum image of the second microscopy slide, a second image capturing substantially the first frequency band of the second microscopy slide; and
determining a distortion map by aligning the first image and the second image, wherein the determined distortion map is used in combination with at least one of the combined spectrum images to facilitate further medical diagnosis.

21. A method according to claim 20, wherein the identifying the second image comprises:
analyzing illumination conditions used to capture images in the second plurality of images;
comparing the illumination conditions associated with the second plurality of image with the first illumination condition to select a similar illumination condition; and
selecting, from the second plurality of images, an intensity image associated with the selected similar illumination condition.

22. A non-transitory computer readable storage medium having a program recorded thereon, the program being executable by a processor for processing images captured using a microscopy device, the program comprising:
code for capturing, for each of a first microscopy slide and a second microscopy slide, a plurality of partial spectrum images under multiple optical configurations so that each partial spectrum image captures a different portion of the spectrum of substantially same area of at least one of the first microscopy slide and the second microscopy slide;
code for selecting, from a first plurality of partial spectrum images, a partial spectrum image associated with a first optical configuration, wherein the first plurality of partial spectrum images is used to reconstruct a first combined spectrum image of at least part of the first microscopy slide;
code for determining a partial spectrum image in a second plurality of partial spectrum images captured under substantially the same optical configuration as the selected partial spectrum image to establish a first pair of partial spectrum images, wherein the second plurality of partial spectrum images is used to reconstruct a second combined spectrum image of at least part of the second microscopy slide;
code for determining a distortion map by aligning images derived from the first pair of the corresponding partial spectrum images, wherein the determined distortion map is used to process at least one of the first and second combined spectrum images.

23. A microscopy system comprising:
a microscopy device for capturing microscopy images;
a non-transient computer readable memory having a program recorded thereon;
computer apparatus coupled to the microscopy device and the memory for recording the captured images and for executing the program to process the captured images, the program comprising:
code for capturing, for each of a first microscopy slide and a second microscopy slide, a plurality of partial spectrum images under multiple optical configurations so that each partial spectrum image captures a different portion of the spectrum of substantially same area of at least one of the first microscopy slide and the second microscopy slide;
code for selecting, from a first plurality of partial spectrum images, a partial spectrum image associated with a first optical configuration, wherein the first plurality of partial spectrum images is used to reconstruct a first combined spectrum image of at least part of the first microscopy slide;
code for determining a partial spectrum image in a second plurality of partial spectrum images captured under substantially same optical configuration as the selected partial spectrum image to establish a first pair of partial spectrum images, wherein the second plurality of partial spectrum images is used to reconstruct a second combined spectrum image of at least part of the second microscopy slide;
code for determining a distortion map by aligning images derived from the first pair of the corresponding partial spectrum images, wherein the determined distortion map is used to process at least one of the first and second combined spectrum images.

* * * * *